US011796899B2

(12) United States Patent
Inoue et al.

(10) Patent No.: US 11,796,899 B2
(45) Date of Patent: Oct. 24, 2023

(54) CONTROL DEVICE, PROJECTION APPARATUS, CONTROL METHOD, AND CONTROL PROGRAM

(71) Applicant: FUJIFILM Corporation, Tokyo (JP)

(72) Inventors: Kazuki Inoue, Saitama (JP); Akihiro Ishizuka, Saitama (JP); Tomonori Masuda, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 4 days.

(21) Appl. No.: 17/583,927

(22) Filed: Jan. 25, 2022

(65) Prior Publication Data

US 2022/0146918 A1     May 12, 2022

Related U.S. Application Data

(63) Continuation of application No. PCT/JP2020/021644, filed on Jun. 1, 2020.

(30) Foreign Application Priority Data

Jul. 26, 2019   (JP) .................................. 2019-138119

(51) Int. Cl.
*G03B 21/14*   (2006.01)
*G03B 21/20*   (2006.01)

(52) U.S. Cl.
CPC ......... *G03B 21/142* (2013.01); *G03B 21/147* (2013.01); *G03B 21/206* (2013.01)

(58) Field of Classification Search
CPC .. G03B 21/142; G03B 21/145; G03B 21/147; G03B 21/206; H04N 9/3141;

(Continued)

(56) References Cited

U.S. PATENT DOCUMENTS 5,838,396 A  11/1998 Shiota et al.
10,101,957 B2 * 10/2018 Yamamoto ........... H04N 9/3155
(Continued)

FOREIGN PATENT DOCUMENTS

JP    8-223519 A    8/1996
JP   11-196356 A    7/1999
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/021644, dated Feb. 10, 2022.

(Continued)

*Primary Examiner* — Sultan Chowdhury
(74) *Attorney, Agent, or Firm* — Birch, Stewart, Kolasch & Birch, LLP

(57) ABSTRACT

A control device of a projection apparatus that projects an image from a display portion displaying the image based on input image data to a projection object through an optical system, includes: a correction portion that corrects the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount.

23 Claims, 13 Drawing Sheets

(58) Field of Classification Search
CPC .. H04N 9/3152; H04N 9/3158; H04N 9/3182; H04N 9/3185; H04N 9/3188; G06T 3/4053; G06T 3/4061; G06T 3/4069; G06T 3/4076; G06T 3/4084; G06T 3/4092; B41J 2/2139; B41J 2/2142; B41J 2/2146
See application file for complete search history.

(56) References Cited

U.S. PATENT DOCUMENTS

| | | | |
|---|---|---|---|
| 2005/0078227 A1 | 4/2005 | Kobayashi et al. | |
| 2006/0055830 A1 | 3/2006 | Sakashita | |
| 2012/0057049 A1* | 3/2012 | Imagawa | G06T 3/4061 348/E9.053 |
| 2015/0093046 A1* | 4/2015 | Okizaki | G06T 3/4069 382/299 |
| 2016/0309056 A1* | 10/2016 | Wakui | H04N 1/605 |
| 2020/0007813 A1* | 1/2020 | Ichi | G03B 17/54 |

FOREIGN PATENT DOCUMENTS

| | | |
|---|---|---|
| JP | 2003-18502 A | 1/2003 |
| JP | 2004-226608 A | 8/2004 |
| JP | 2006-113541 A | 4/2006 |
| JP | 2008-70711 A | 3/2008 |
| JP | 2009-216767 A | 9/2009 |
| JP | 2017-215475 A | 12/2017 |

OTHER PUBLICATIONS

International Search Report (Form PCT/ISA/210) for International Application No. PCT/JP2020/021644, dated Aug. 4, 2020, with English translation.

* cited by examiner

FIG. 10
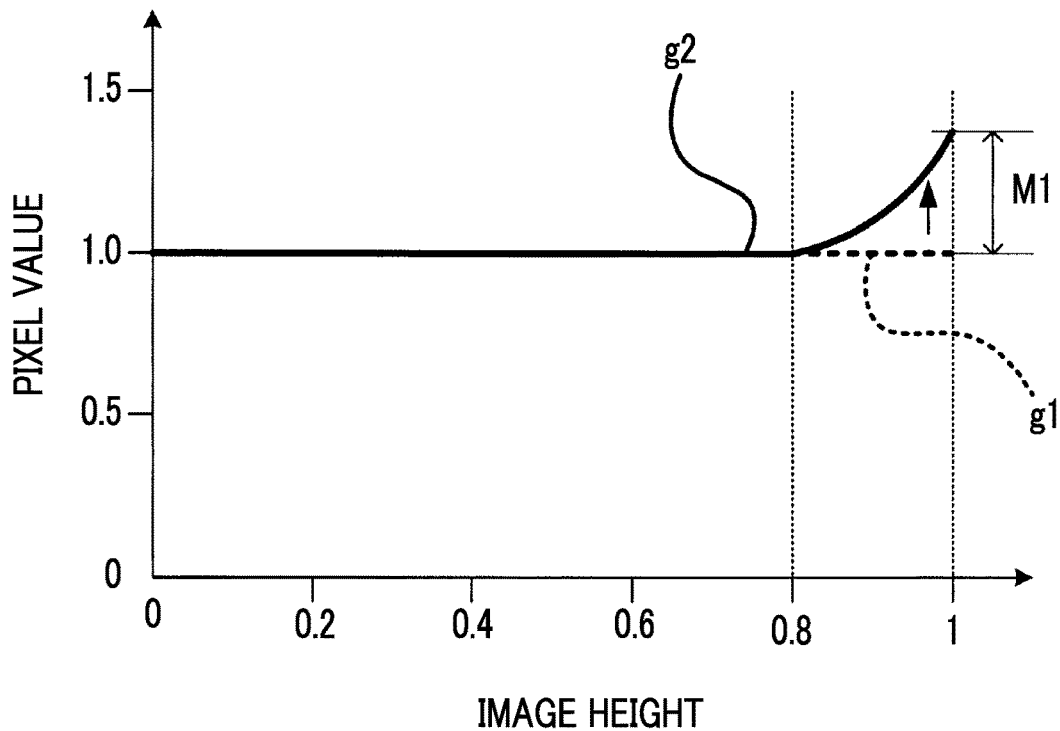
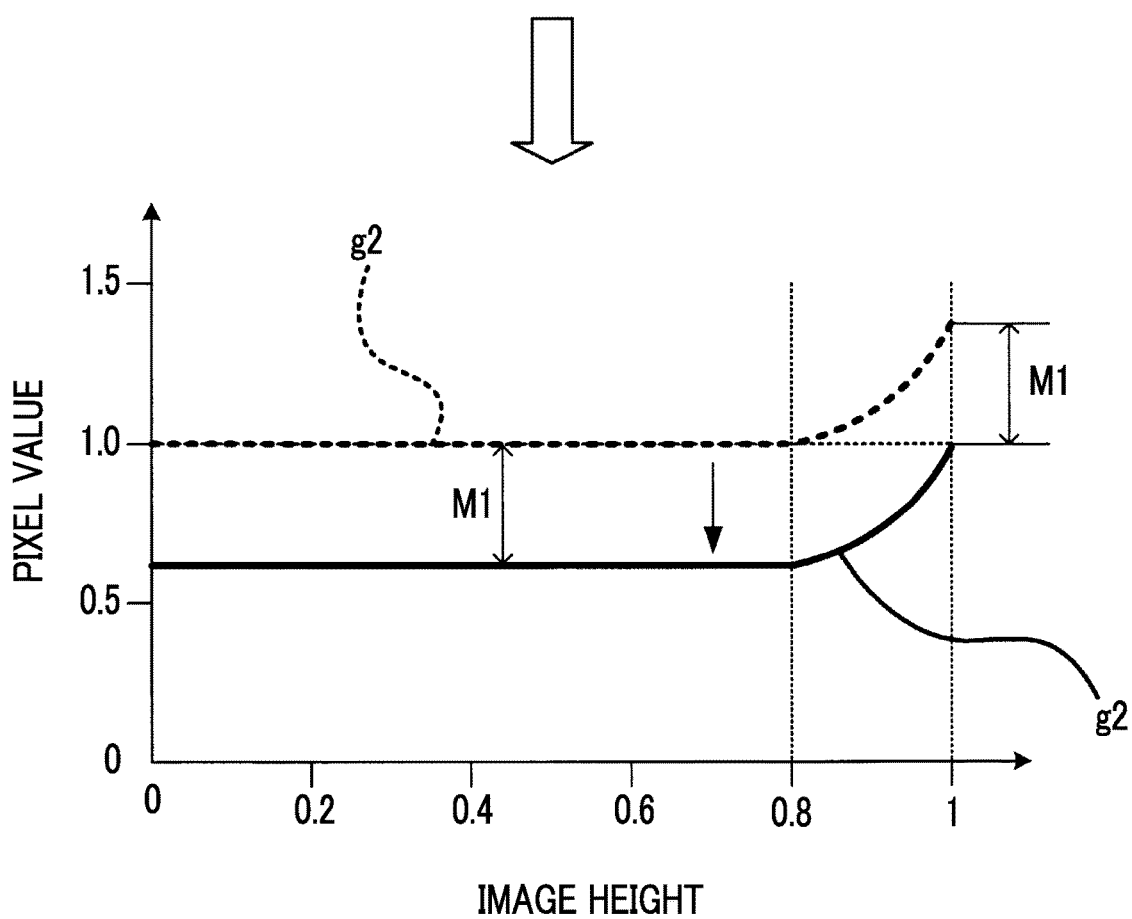

FIG. 13

CONTROL DEVICE, PROJECTION APPARATUS, CONTROL METHOD, AND CONTROL PROGRAM

CROSS REFERENCE TO RELATED APPLICATION

This is a continuation of International Application No. PCT/JP2020/021644 filed on Jun. 1, 2020, and claims priority from Japanese Patent Application No. 2019-138119 filed on Jul. 26, 2019, the entire disclosures of which are incorporated herein by reference.

BACKGROUND OF THE INVENTION

1. Field of the Invention

The present invention relates to a control device, a projection apparatus, a control method, and a computer readable medium storing a control program.

2. Description of the Related Art

A projection apparatus having a function of suppressing a decrease in brightness caused in an edge part of a projection image has been known. For example, JP2004-226608A discloses correction of brightness unevenness of a projection image by increasing brightness of an edge part portion with respect to brightness of a center portion of the projection image. JP2009-216767A discloses achievement of uniform brightness of each pixel of a projection image by using minimum brightness of the projection image as standard brightness, using a value obtained by dividing the standard brightness by brightness of each pixel of the projection image as a correction coefficient, and multiplying each pixel of image information that is a base of the projection image by the correction coefficient. In the disclosure of JP2009-216767A, correction is not available in a state where a pixel at an end of the projection image has the maximum brightness. Thus, a pixel value of a pixel having the minimum brightness at the end of the projection image is used as the standard brightness.

SUMMARY OF THE INVENTION

One embodiment according to the disclosed technology provides a control device, a projection apparatus, a control method, and a computer readable medium storing a control program that can reduce brightness unevenness of a projection image without significantly decreasing brightness of the image.

A control device according to an aspect of the present invention is a control device of a projection apparatus that projects an image from a display portion displaying the image based on input image data to a projection object through an optical system, and comprises a correction portion that corrects the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount.

A projection apparatus according to an aspect of the present invention comprises the control device and the optical system.

A control method according to an aspect of the present invention is a control method of a projection apparatus that projects an image from a display portion displaying the image based on input image data to a projection object through an optical system, and comprises a correction step of correcting the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount.

A control program according to an aspect of the present invention is a control program of a projection apparatus that projects an image from a display portion displaying the image based on input image data to a projection object through an optical system, and causes a computer to execute a correction step of correcting the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount.

According to the present invention, a control device, a projection apparatus, a control method, and a control program that can reduce brightness unevenness of a projection image without significantly decreasing brightness of the image can be provided.

BRIEF DESCRIPTION OF THE DRAWINGS

FIG. 10 is a schematic diagram for describing the operation of the system control portion 14.

FIG. 13 is a schematic diagram illustrating an example of the information stored in the ROM of the system control portion 14.

DESCRIPTION OF THE PREFERRED EMBODIMENTS

Hereinafter, an embodiment of the present invention will be described with reference to the drawings.

Figure 1:
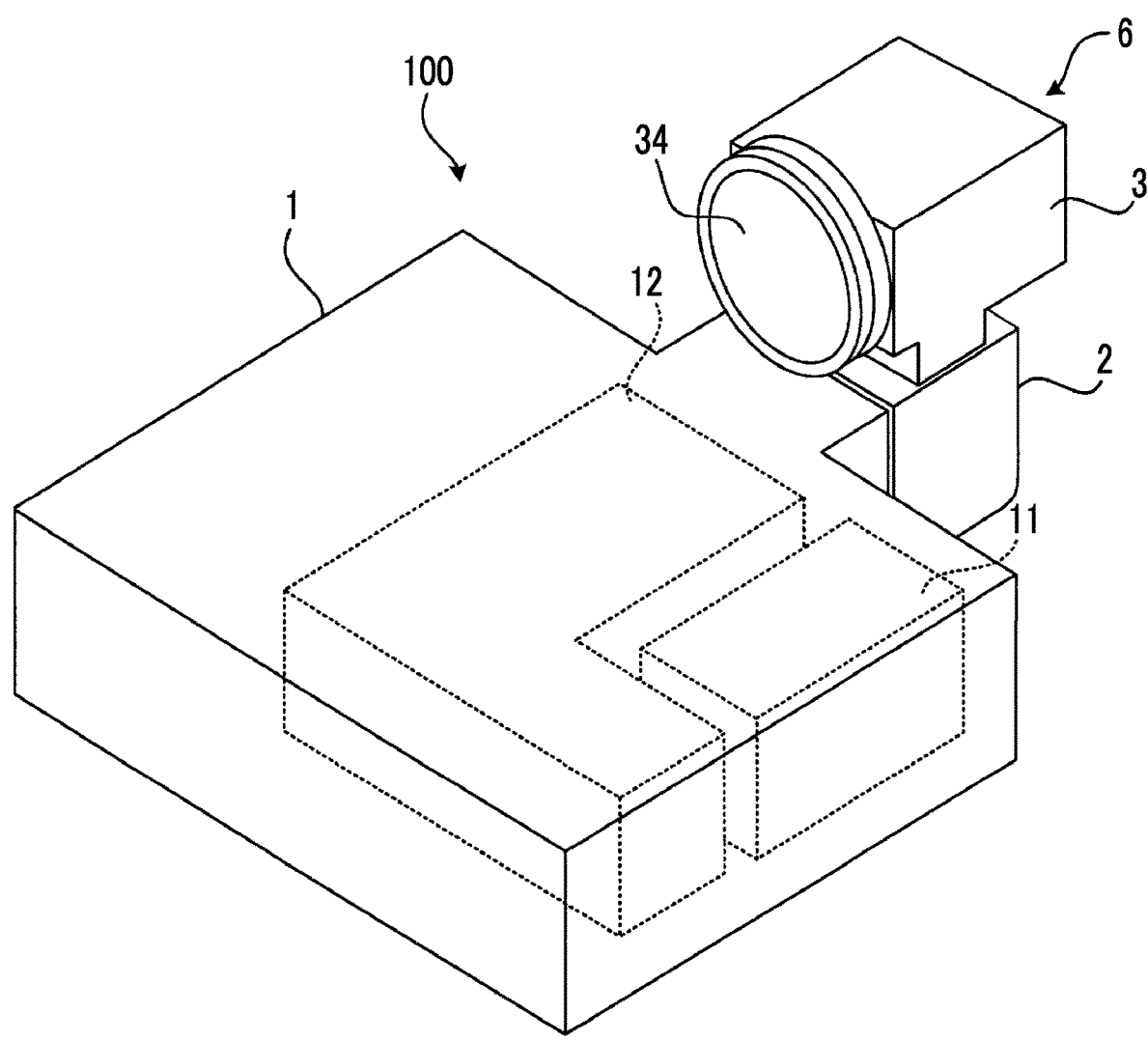
FIG. 1 is a schematic diagram illustrating an exterior configuration of a projector 100 that is an embodiment of a projection apparatus according to the embodiment of the present invention.
Figure 2:
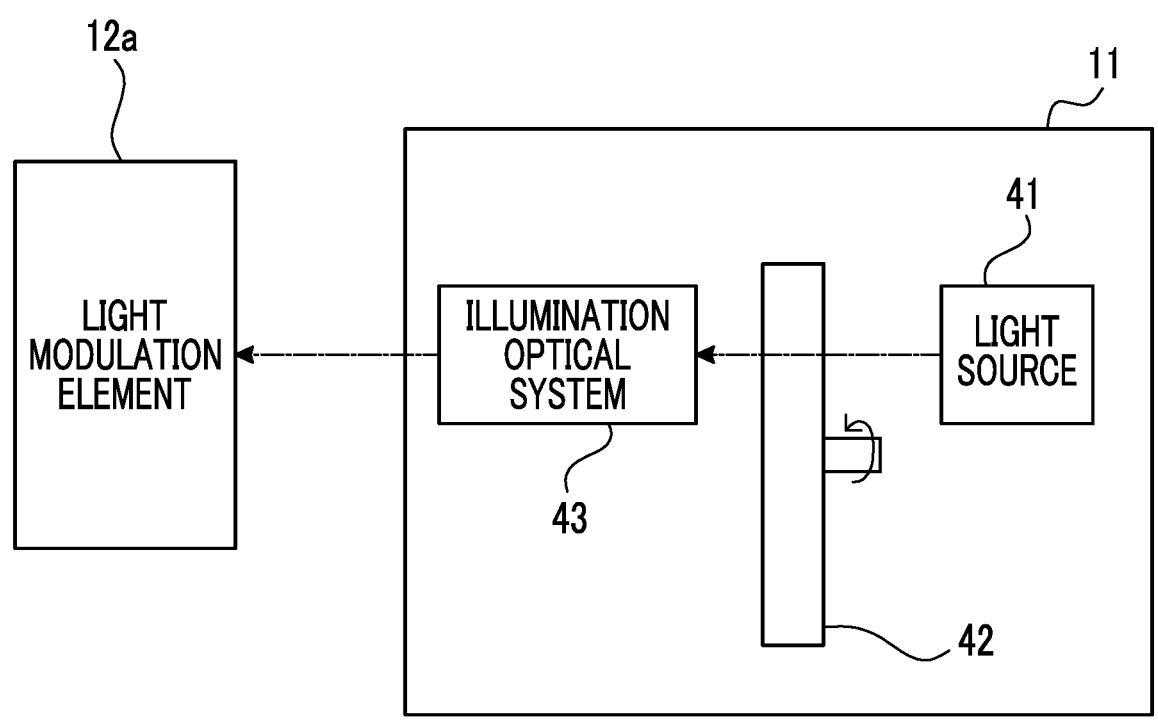
FIG. 2 is a schematic diagram illustrating an example of an internal configuration of a light source unit 11 in FIG. 1.
Figure 3:
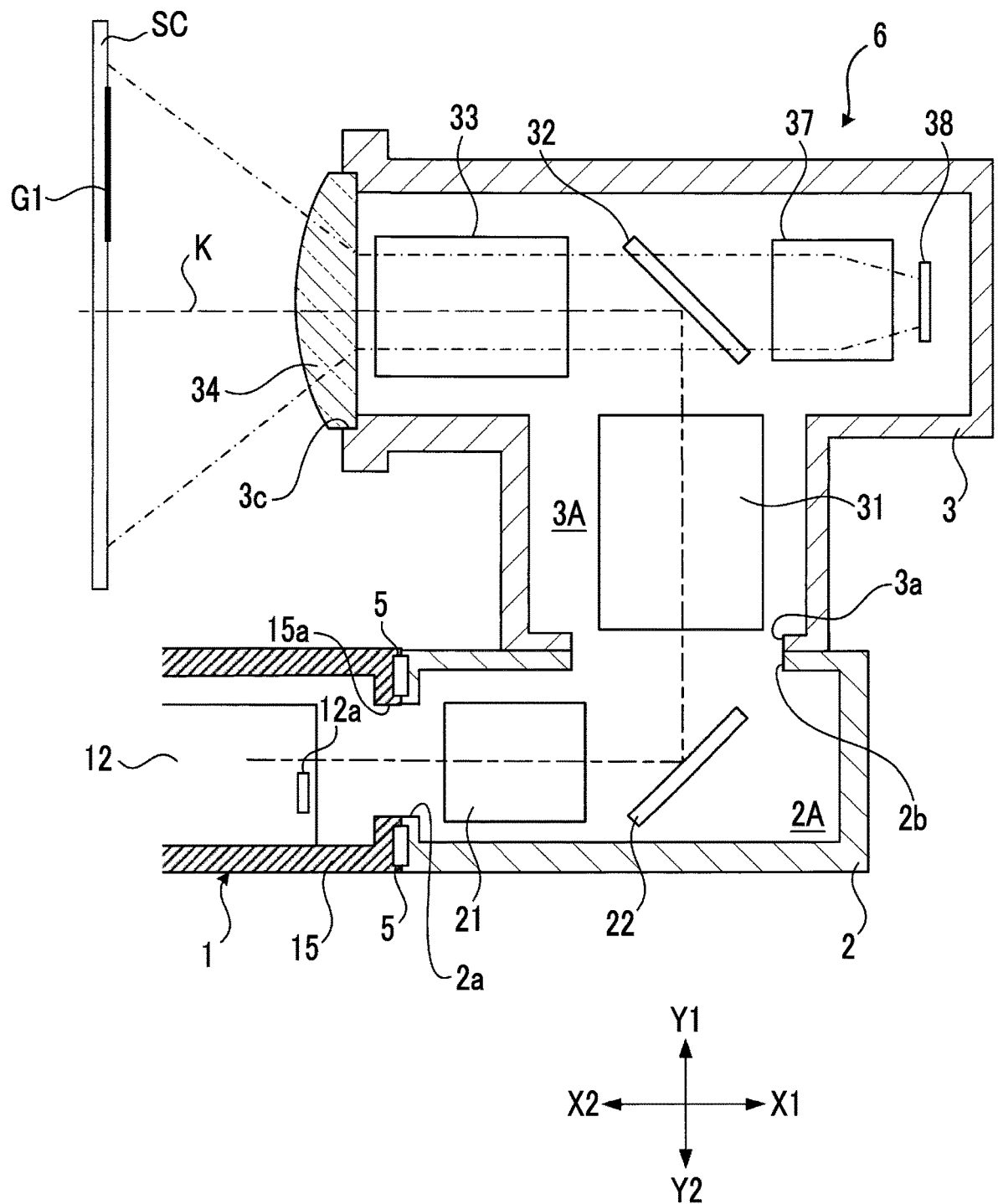
FIG. 3 is a schematic cross-sectional view of an optical unit 6 of the projector 100 illustrated in FIG. 1.

FIG. 1 is a schematic diagram illustrating an exterior configuration of a projector 100 that is an embodiment of a projection apparatus according to the embodiment of the present invention. FIG. 2 is a schematic diagram illustrating an example of an internal configuration of a light source unit 11 in FIG. 1. FIG. 3 is a schematic cross-sectional view of an optical unit 6 of the projector 100 illustrated in FIG. 1. FIG. 3 illustrates a cross section in a plane along an optical path of light emitted from a body part 1.

As illustrated in FIG. 1, the projector 100 comprises the body part 1 and the optical unit 6 disposed to protrude from the body part 1. The optical unit 6 comprises a first member 2 supported by the body part 1 and a second member 3 supported by the first member 2. The second member 3 may be fixed to the first member 2 in a rotatable state. In addition, the first member 2 and the second member 3 may be integrated members. The optical unit 6 may be attachably and detachably configured (in other words, interchangeably configured) with respect to the body part 1.

The body part 1 includes a housing 15 (refer to FIG. 3) in which an opening 15a (refer to FIG. 3) for causing light to pass to a part connected to the optical unit 6 is formed.

As illustrated in FIG. 1, the light source unit 11 and a light modulation unit 12 including a light modulation element 12a (refer to FIG. 2) that generates an image by spatially modulating light emitted from the light source unit 11 based on input image data are disposed inside the housing 15 of the body part 1. A display portion is configured with the light source unit 11 and the light modulation unit 12.

In the example illustrated in FIG. 2, the light source unit 11 comprises a light source 41 emitting white light, a color wheel 42, and an illumination optical system 43. The light source 41 is configured to include a light emitting element such as a laser or a light emitting diode (LED). The color wheel 42 is arranged between the light source 41 and the illumination optical system 43. The color wheel 42 is a member having a circular plate shape. An R filter that allows transmission of red light, a G filter that allows transmission of green light, and a B filter that allows transmission of blue light are disposed in a circumferential direction of the color wheel 42. The color wheel 42 is rotated about a shaft and guides the white light emitted from the light source 41 to the illumination optical system 43 by separating the white light into red light, green light, and blue light in a time-division manner. Light emitted from the illumination optical system 43 is incident on the light modulation element 12a.

In a case of the configuration of the light source unit 11 in FIG. 2, for example, a digital micromirror device (DMD) is used as the light modulation element 12a included in the light modulation unit 12. A liquid crystal on silicon (LCOS), a micro electro mechanical systems (MEMS) element, a liquid crystal display device, or the like can also be used as the light modulation element 12a. As illustrated in FIG. 3, the image (display image of the display portion) formed by the light spatially modulated by the light modulation unit 12 is incident on the optical unit 6 by passing through the opening 15a of the housing 15 and is projected to a screen SC as a projection object. Accordingly, an image G1 can be visible from an observer.

The light modulation element 12a is configured to include a display surface on which a display pixel for forming one pixel of the image G1 is two-dimensionally arranged.

As illustrated in FIG. 3, the optical unit 6 comprises the first member 2 including a hollow portion 2A connected to the inside of the body part 1, the second member 3 including a hollow portion 3A connected to the hollow portion 2A, a first optical system 21 and a reflective member 22 arranged in the hollow portion 2A, and a second optical system 31, a branch member 32, a third optical system 33, a fourth optical system 37, an imaging element 38, and a lens 34 arranged in the hollow portion 3A, and a shift mechanism 5.

The first member 2 is a member of which a cross-sectional exterior shape is, for example, a rectangular shape. An opening 2a and an opening 2b are formed in surfaces perpendicular to each other. The first member 2 is supported by the body part 1 in a state where the opening 2a is arranged at a position facing the opening 15a of the body part 1. Light emitted from the light modulation element 12a of the light modulation unit 12 of the body part 1 is incident into the hollow portion 2A of the first member 2 by passing through the opening 15a and the opening 2a.

An incidence direction of the light incident into the hollow portion 2A from the body part 1 will be referred to as a direction X1. A direction opposite to the direction X1 will be referred to as a direction X2. The direction X1 and the direction X2 will be collectively referred to as a direction X. In addition, a depth direction from the front of FIG. 3 and a direction opposite to the depth direction will be referred to as a direction Z. In the direction Z, the depth direction from the front of FIG. 3 will be referred to as a direction Z1, and a forward direction from the back of FIG. 3 will be referred to as a direction Z2. In addition, a direction perpendicular to the direction X and the direction Z will be referred to as a direction Y. In the direction Y, an upward direction in FIG. 3 will be referred to as a direction Y1, and a downward direction in FIG. 3 will be referred to as a direction Y2. In the example in FIG. 3, the projector 100 is arranged such that the direction Y2 is a vertical direction.

The first optical system 21, the reflective member 22, the second optical system 31, the branch member 32, the third optical system 33, and the lens 34 constitute an optical system (hereinafter, referred to as a projection optical system) for projecting the image formed by the light modulation element 12a to the screen SC. An optical axis K of the projection optical system is illustrated in FIG. 3. The first optical system 21, the reflective member 22, the second optical system 31, the branch member 32, the third optical system 33, and the lens 34 are arranged in this order from the light modulation element 12a side along the optical axis K. In the example in FIG. 3, the light modulation element 12a is arranged in a biased manner to the direction Y2 side of the optical axis K. In other words, a center of the image (center of a display surface 12A described later) formed by the light modulation element 12a does not match the optical axis K and is positioned on the direction Y2 side of the optical axis K.

The first optical system 21 includes at least one lens and guides, to the reflective member 22, light that is incident on the first member 2 from the body part 1 and travels in the direction X1.

The reflective member 22 reflects the light incident from the first optical system 21 in the direction Y1. The reflective member 22 is configured with, for example, a mirror. In the first member 2, the opening 2b is formed on an optical path of the light reflected by the reflective member 22. The reflected light travels to the hollow portion 3A of the second member 3 by passing through the opening 2b.

The second member 3 is a member of which a cross-sectional exterior shape is an approximately T shape. An opening 3a is formed at a position facing the opening 2b of the first member 2. The light that has passed through the opening 2b of the first member 2 from the body part 1 is incident into the hollow portion 3A of the second member 3 by passing through the opening 3a. The first member 2 and the second member 3 may have any cross-sectional exterior shapes and are not limited to the above cross-sectional exterior shapes.

The second optical system 31 includes at least one lens and guides light incident from the first member 2 to the branch member 32.

The branch member 32 guides the light incident from the second optical system 31 to the third optical system 33 by reflecting the light in the direction X2. In addition, the branch member 32 guides subject light that is incident on the lens 34 from the screen SC side and travels in the direction X1 by passing through the third optical system 33, to the fourth optical system 37 by allowing transmission of the subject light. The branch member 32 is configured with, for example, a half mirror or a polarizing plate.

The third optical system 33 includes at least one lens and guides the light reflected by the branch member 32 to the lens 34.

The lens 34 is arranged in an end part of the second member 3 on the direction X2 side and covers an opening 3c formed in the end part. The lens 34 projects the light incident from the third optical system 33 to the screen SC.

The fourth optical system 37 includes at least one lens and is arranged adjacent to the branch member 32 on the direction X1 side and guides, to the imaging element 38, the subject light that is transmitted through the branch member 32 and travels in the direction X1. An optical axis of the fourth optical system 37 matches optical axes of the lens 34 and the third optical system 33. The fourth optical system 37 may include a lens having a variable focal length.

The imaging element 38 is a charge coupled device (CCD) image sensor, a complementary metal oxide semiconductor (CMOS) image sensor, or the like. The imaging element 38 images the screen SC through the lens 34, the third optical system 33, the branch member 32, and the fourth optical system 37. The lens 34, the third optical system 33, and the branch member 32 constitute a part of the projection optical system.

The shift mechanism 5 is a mechanism for moving the optical axis K of the projection optical system (in other words, the optical unit 6) in a direction (direction Y in FIG. 3) perpendicular to the optical axis K. Specifically, the shift mechanism 5 is configured to be capable of changing a position of the first member 2 in the direction Y with respect to the body part 1. The shift mechanism 5 may manually move the first member 2 or electrically move the first member 2.

FIG. 3 illustrates a state where the first member 2 is moved to the maximum to the direction Y1 side by the shift mechanism 5. By moving the first member 2 in the direction Y2 from the state illustrated in FIG. 3 using the shift mechanism 5, a relative position between the center of the image (in other words, the center of the display surface) formed by the light modulation element 12a and the optical axis K changes, and the image G1 projected to the screen SC can be shifted (translated) in the direction Y2.

The shift mechanism 5 may be a mechanism that moves the light modulation element 12a in the direction Y instead of moving the optical unit 6 in the direction Y. Even in this case, the image G1 projected to the screen SC can be shifted in the direction Y2.

Figure 4:
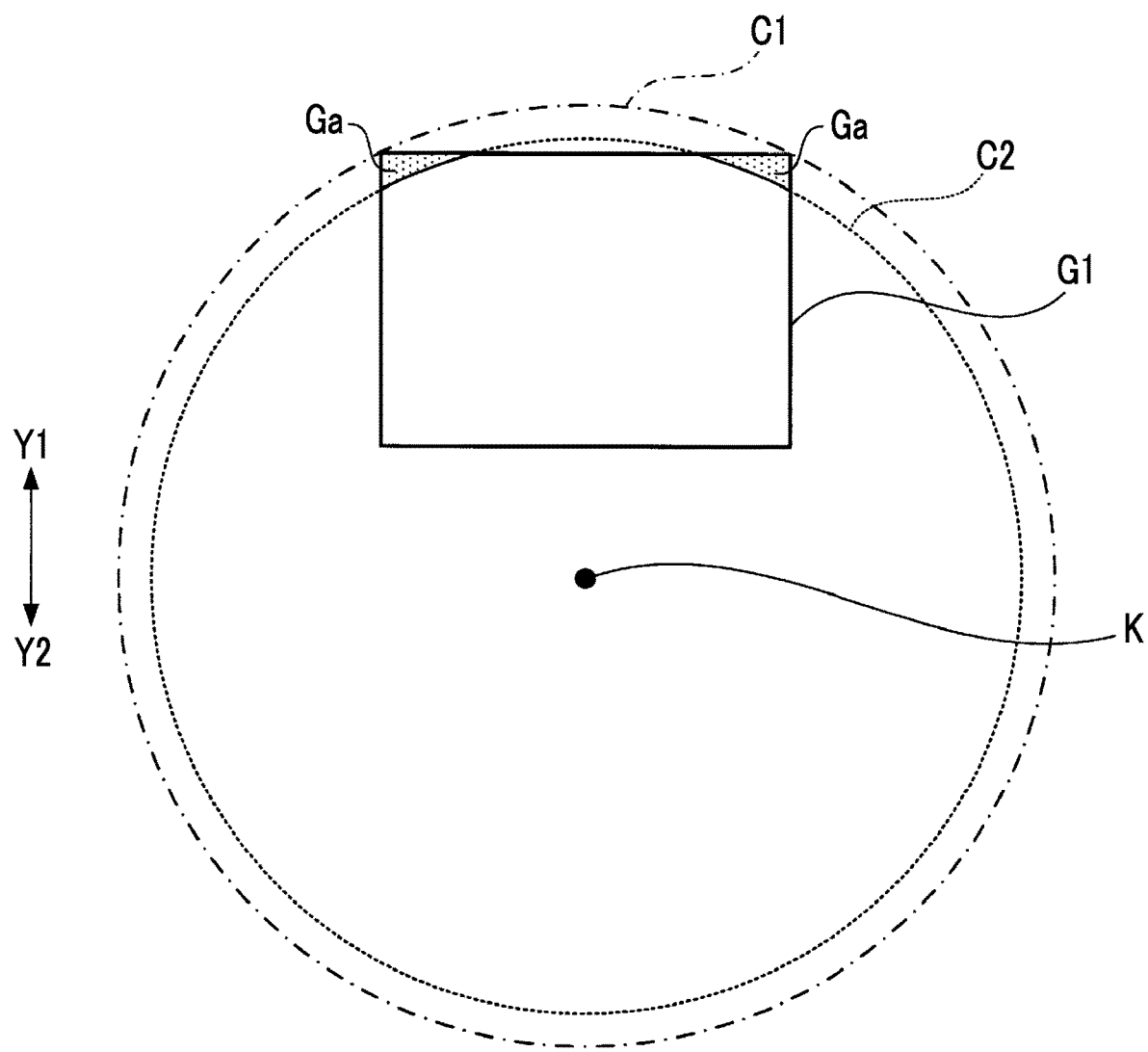
FIG. 4 is a schematic diagram in which an image G1 projected to a screen SC is viewed in a direction X2.

FIG. 4 is a schematic diagram in which the image G1 projected to the screen SC is viewed in the direction X2. FIG. 4 illustrates a state (state where a shift position of the first member 2 is a shift position PU) where the first member 2 is moved to the maximum to the direction Y1 side by the shift mechanism 5.

In FIG. 4, an image circle C1 that indicates a light-receiving range, in the screen SC, of light emittable from the projection optical system is illustrated. A boundary circle C2 is illustrated inside the image circle C1 on the same plane as the image circle C1. Each of the image circle C1 and the boundary circle C2 is a concentric circle centered at the optical axis K.

In the projector 100, an optical characteristic of the projection optical system is such that a light quantity of light projected within a range inside the boundary circle C2 in the screen SC is approximately uniform, and a light quantity of light projected within a range outside the boundary circle C2 in the screen SC is decreased with respect to the light quantity of the light projected within the range inside the boundary circle C2. That is, in a case where uniform light is emitted from the projection optical system, a light quantity projected within a range (hereinafter, referred to as a light quantity decreased range) between the boundary circle C2 and an outer circumference of the image circle C1 is decreased with respect to a light quantity projected inside the boundary circle C2. The light quantity projected inside the boundary circle C2 may have a distribution in which the light quantity is gradually decreased toward an edge part from the optical axis K.

In a case where a value obtained by dividing a light quantity Kb projected within the light quantity decreased range by a light quantity Ka projected to a position of the optical axis K in the screen SC is used as a ratio (hereinafter, referred to as an edge part light quantity ratio) of the light quantity Ka and the light quantity Kb, and a radius of a concentric circle centered at the optical axis K is defined as an image height, the edge part light quantity ratio is decreased as the image height is increased.

As illustrated in FIG. 4, in a state where the shift position of the first member 2 is the shift position PU, a part of the image G1 projected to the screen SC overlaps with the light quantity decreased range. Accordingly, the image G1 has a non-uniform light quantity distribution in a projection plane.

Specifically, in the image G1, a light quantity is decreased in a specific region Ga outside the boundary circle C2 with respect to a region inside the boundary circle C2. In the specific region Ga, a degree of decrease in light quantity with respect to the light quantity Ka is increased as the image height at the position of the light quantity is increased. The specific region Ga of the image G1 is a region that is decided (determined) by the light quantity distribution of the image G1 caused by the optical characteristic (edge part light quantity ratio) of the projection optical system, and in which the light quantity is relatively decreased.

A position and a size of the specific region Ga in the image G1 may change depending on a projection condition. The projection condition is any one of a focal length of the projection optical system, a focal position of the projection optical system, and a distance between the projection optical system and the screen SC, or a combination of a selected plurality thereof In addition, the position of the specific region Ga in the image G1 may change depending on the shift position of the first member 2 based on the shift mechanism 5.

Figure 5:
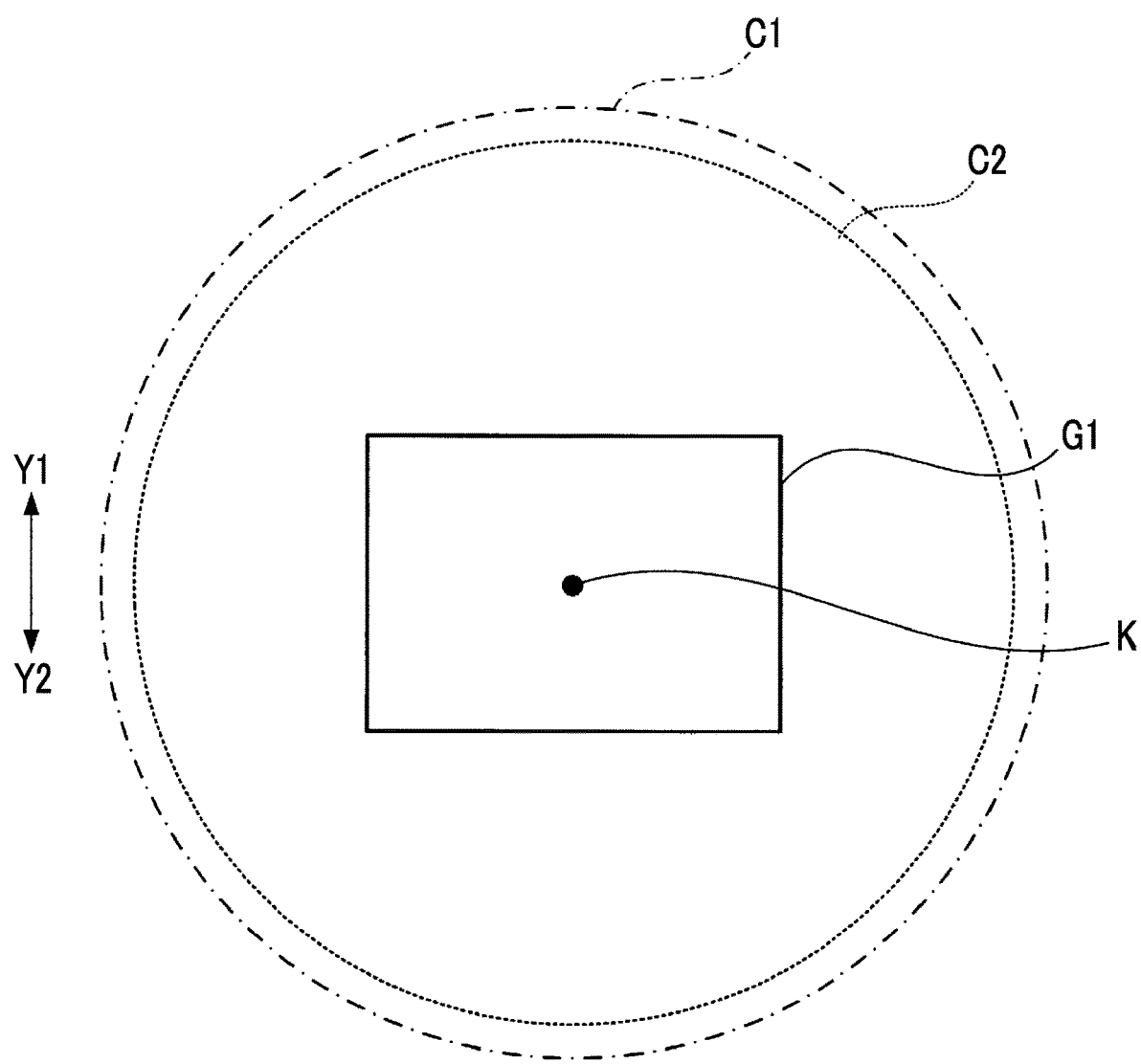
FIG. 5 is a diagram illustrating a state where a first member 2 is moved to a direction Y2 side from a state illustrated in FIG. 4 by a shift mechanism 5.

FIG. 5 is a diagram illustrating a state where the first member 2 is moved to the direction Y2 side from the state illustrated in FIG. 4 by the shift mechanism 5. FIG. 5 illustrates a state (state where the shift position of the first member 2 is a shift position PC) where a center of the image G1 and the optical axis K match. In the state illustrated in FIG. 5, the image G1 does not overlap with the light quantity decreased range. Thus, the specific region Ga does not occur in the image G1.

Figure 6:
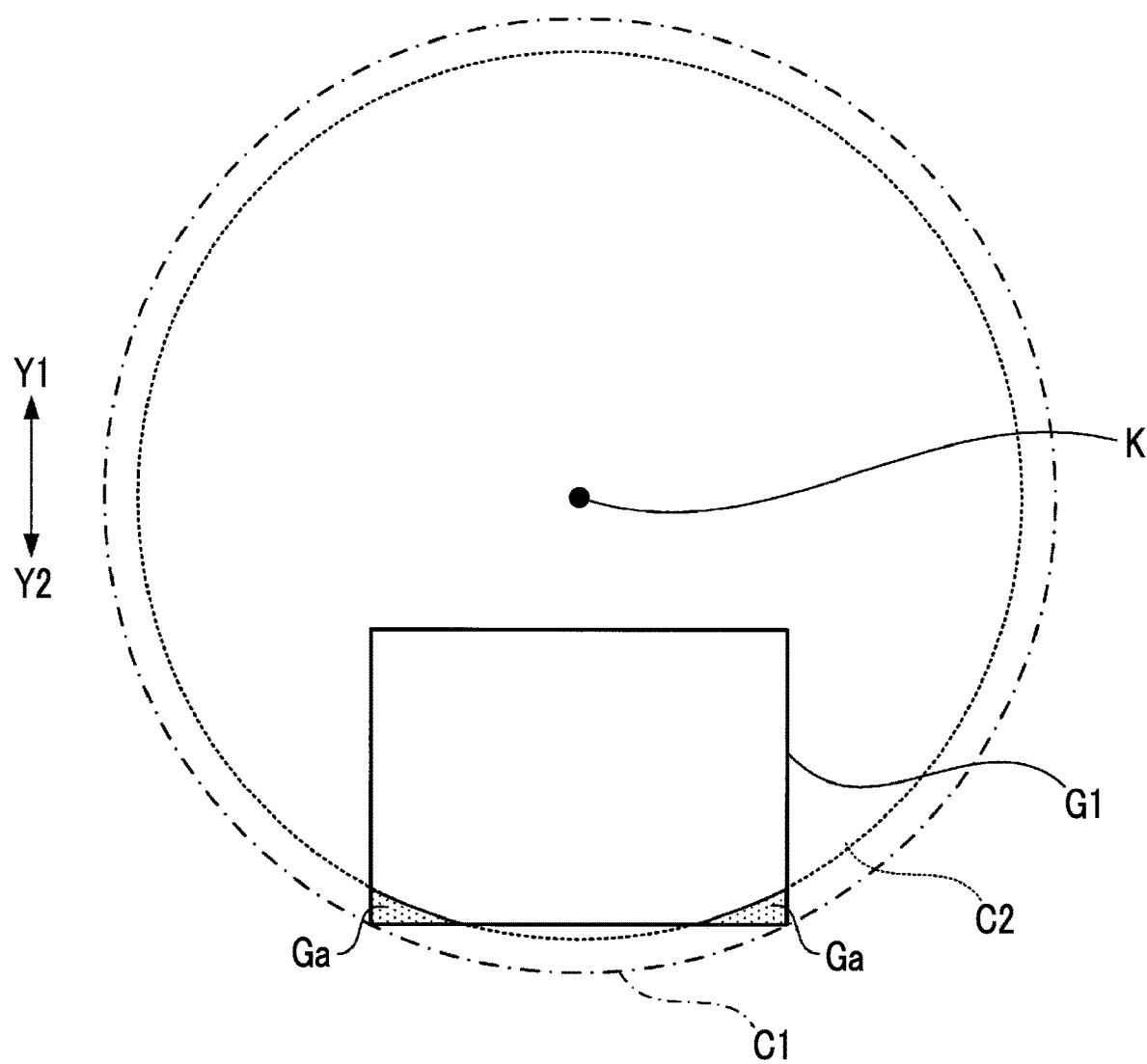
FIG. 6 is a diagram illustrating a state where the first member 2 is moved to the direction Y2 side from a state illustrated in FIG. 5 by the shift mechanism 5.

FIG. 6 is a diagram illustrating a state where the first member 2 is moved to the direction Y2 side from the state illustrated in FIG. 5 by the shift mechanism 5. FIG. 6 illustrates a state (state where the shift position of the first member 2 is a shift position PD) where the first member 2 is moved to the maximum to the direction Y2 side by the shift mechanism 5.

In the state illustrated in FIG. 6, the image G1 overlaps with the light quantity decreased region. Thus, the specific region Ga occurs in the image G1. However, the position of the specific region Ga is a position that is inverted upside down from the position in FIG. 5. Accordingly, the position of the specific region Ga in the image G1 changes depending on a shifted state of the first member 2.

Figure 7:
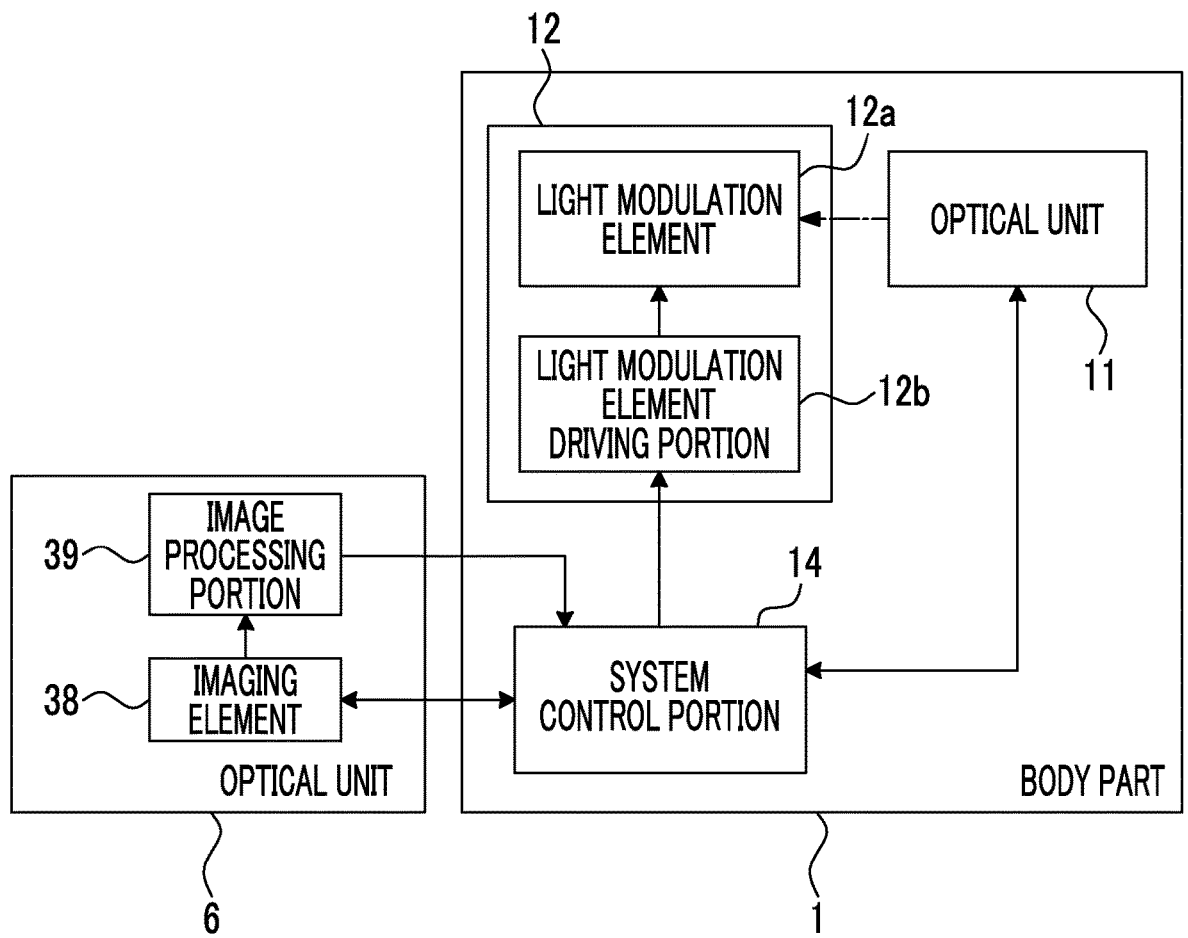
FIG. 7 is a schematic diagram illustrating an internal block configuration of the projector 100 illustrated in FIG. 1.

FIG. 7 is a schematic diagram illustrating an internal block configuration of the projector 100 illustrated in FIG. 1. The light source unit 11, the light modulation unit 12 including the light modulation element 12a and a light modulation element driving portion 12b driving the light modulation element 12a, and a system control portion 14 controlling the entire projector 100 are disposed in the body part 1 of the projector 100. The imaging element 38 and the image processing portion 39 that generates captured image data by processing the captured image signal input from the imaging element 38 are disposed in the optical unit 6. The captured image data generated by the image processing portion 39 is input into the system control portion 14. An imaging portion is configured with the imaging element 38 and the image processing portion 39.

The light modulation element driving portion 12b drives the light modulation element 12a based on the input image data input from the system control portion 14 and spatially modulates the light from the light source unit 11 using the input image data. The input image data is not limited to image data input from an external apparatus such as a personal computer, a smartphone, or a tablet terminal and may be input image data generated inside the projector 100. In addition, a data format of the input image data may be any of digital data and analog data after digital to analog conversion.

The system control portion 14 comprises various processors, a read only memory (ROM), and a random access memory (RAM).

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific type of processing like an application specific integrated circuit (ASIC). A structure of these various processors is more specifically an electric circuit in which circuit elements such as semiconductor elements are combined.

The processors of the system control portion 14 may be configured with one of the various processors or may be configured with a combination of two or more processors of the same type or different types (for example, a combination of a plurality of FPGAs or a combination of a CPU and an FPGA). The processors of the system control portion 14 function as a control device comprising a correction portion by executing a control program.

A case where the image G1 in the state illustrated in FIG. 4 is, for example, a white image in which a pixel value of each pixel of the input image data is an upper limit value (in a case of an 8-bit image, "255") is assumed. In this case, the light quantity is decreased in the specific region Ga of the image G1. Thus, the image G1 is not a white image as a whole and is an image having brightness unevenness of slight darkness in only the specific region Ga. The correction portion corrects the input image data in order to reduce the brightness unevenness.

Specifically, the correction portion corrects the input image data by performing first processing of increasing the pixel values of the pixels of the input image data corresponding to the specific region Ga and second processing of uniformly decreasing each of pixel values of pixels of the input image data by a first pixel amount.

The ROM of the system control portion 14 stores, for each projection condition, information indicating which pixel of the input image data is the pixel (correction target pixel) corresponding to the specific region Ga. In the information about each pixel corresponding to the specific region Ga, the optical characteristic of the projection optical system is stored in association with the correction coefficient corresponding to the edge part light quantity ratio that is decided based on the projection condition. As the correction coefficient corresponding to any pixel, for example, a reciprocal of the edge part light quantity ratio at a position (image height) of the projection image corresponding to the pixel is used. For example, a correction coefficient of "1/0.8" is stored in association with a pixel corresponding to an image height at which the edge part light quantity ratio is 0.8.

Figure 8:
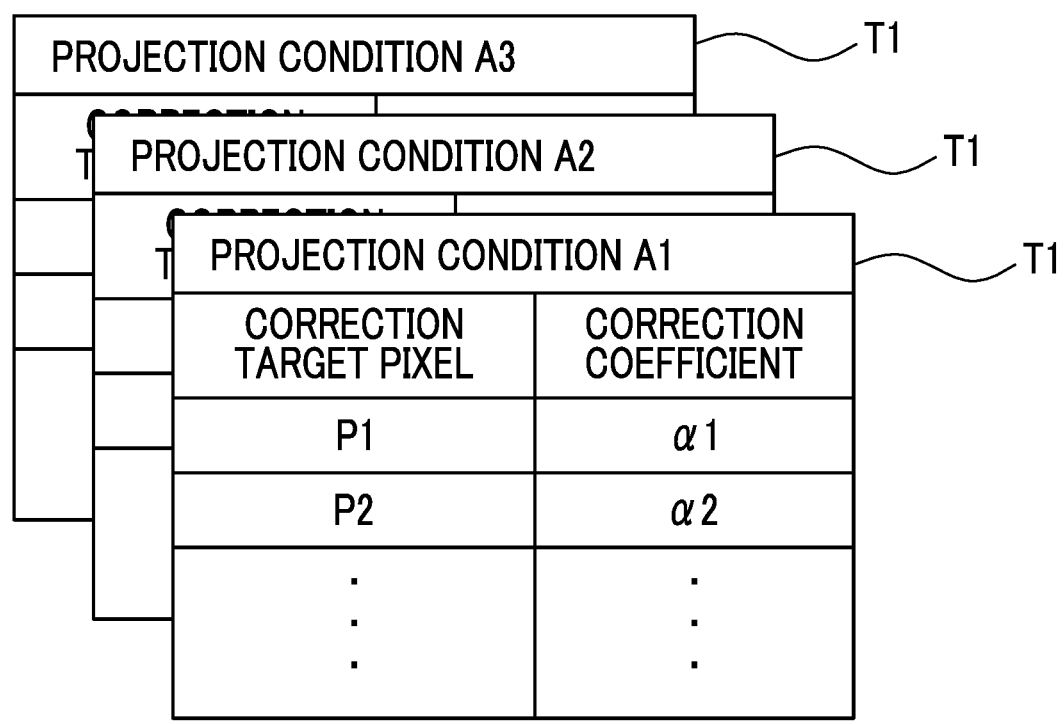
FIG. 8 is a schematic diagram illustrating an example of information stored in a ROM of a system control portion 14.

FIG. 8 is a schematic diagram illustrating an example of the information stored in the ROM of the system control portion 14. As illustrated in FIG. 8, the ROM of the system control portion 14 stores multiple correction tables T1. The correction tables T1 are data tables including, as described above, the projection condition, the information about the pixels (correction target pixels) of the input image data corresponding to the specific region Ga occurring under the projection condition, and the correction coefficient corresponding to the correction target pixel.

The correction tables T1 are prepared and stored for each settable projection condition. In addition, the correction tables T1 for each projection condition illustrated in FIG. 8 are individually created and stored for each of a state where the shift position of the first member 2 is the shift position PU, and a state where the shift position of the first member 2 is the shift position PD.

Figure 9:
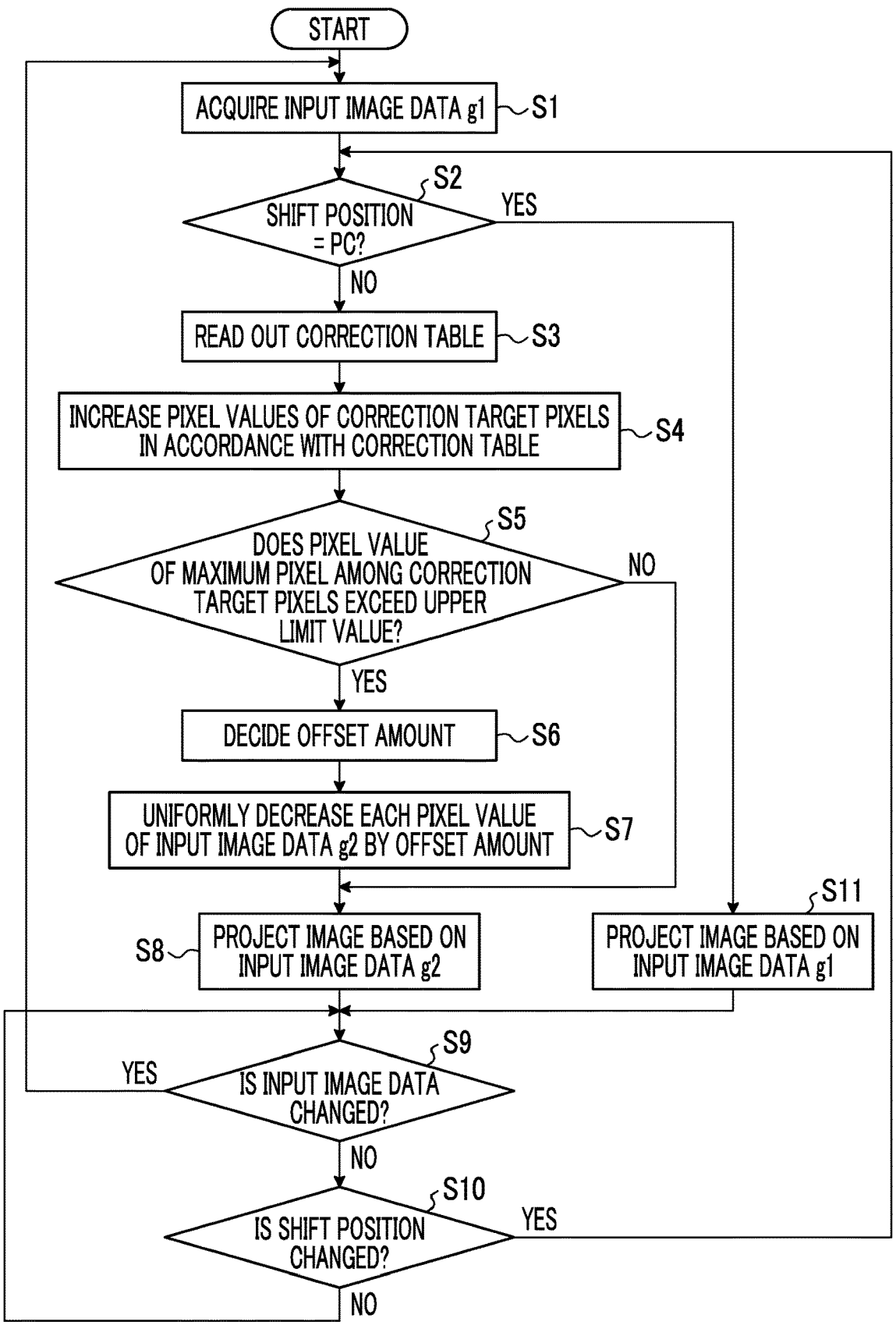
FIG. 9 is a flowchart for describing an operation of the system control portion 14.

FIG. 9 is a flowchart for describing an operation of the system control portion 14. FIG. 10 is a schematic diagram for describing the operation of the system control portion 14.

A horizontal axis of the graph illustrated in FIG. 10 represents a position of each pixel of the input image data as the image height corresponding to each pixel in the projection image. The position of each pixel of the input image data is normalized such that the image height of the image circle C1 is "1". In addition, a vertical axis of the graph illustrated in FIG. 10 illustrates the pixel values of the input image data that are normalized such that an upper limit value inputtable into the light modulation unit 12 is "1.0".

In a case where input image data g1 is acquired (step S1), the system control portion 14 determines the shift position of the first member 2 that is set at the current point in time (step S2). In a case where the shift position is the shift position PC illustrated in FIG. 5 (step S2: YES), the system control portion 14 projects an image based on the input image data g1 to the screen SC from the projection optical system by inputting the acquired input image data g1 into the light modulation unit 12 (step S11). In the configuration of the present embodiment, the light quantity decreased region does not overlap with the image G1 in a case where the shift position is the shift position PC. Thus, in a case where a YES determination is made in step S2, the input image data g1 is not corrected. However, for example, as in a case where the boundary circle C2 is small, in a case where the image G1 overlaps with the light quantity decreased region even in a case where the shift position is the shift position PC, it is preferable that the input image data g1 is corrected using the correction table corresponding to the shift position.

In a case where the shift position is the shift position PU or the shift position PD illustrated in FIG. 4 or FIG. 6 (step S2: NO), the system control portion 14 reads out the correction table T1 corresponding to the projection condition set at the current point in time and the shift position of the first member 2 from the ROM (step S3).

The system control portion 14 performs processing of increasing a pixel value of each correction target pixel by multiplying the pixel value of each correction target pixel designated in the correction table T1 by the correction coefficient corresponding to each correction target pixel among pixels of the input image data g1 (step S4). Step S4 corresponds to the first processing. Hereinafter, data of the input image data g1 after processing in step S4 will be referred to as input image data g2.

FIG. 10 illustrates the input image data g1 of which each pixel value is "1.0", and the input image data g2 after processing in step S4 is performed on the input image data g1. By processing in step S4, pixel values of only a part (pixels within a range of an image height of 0.8 to 1) corresponding to the specific region Ga in the input image data g1 are increased.

Next, the system control portion 14 specifies a maximum pixel having the maximum pixel value among the correction target pixels of which the pixel values are increased in step S4, and determines whether or not the pixel value of the maximum pixel exceeds the upper limit value (for example, in a case of the 8-bit image, "255") inputtable into the light modulation unit 12 (step S5).

In a case where the pixel value of the maximum pixel exceeds the upper limit value (step S5: YES), the system control portion 14 decides, as an offset amount, a value that is obtained by subtracting the pixel value of the maximum pixel before processing in step S4 from the pixel value of the maximum pixel (step S6). The offset amount corresponds to the first pixel amount.

For example, in the example illustrated in FIG. 10, a pixel at the image height "1" in the input image data g2 is the maximum pixel, and the pixel value of the maximum pixel exceeds 1.0 which is the upper limit value. In this example, a difference between the pixel value at the image height "1" in the input image data g2 and the pixel value at the image height "1" in the input image data g1 is denoted by M1, and this is decided as the offset amount.

In a case where the offset amount is decided, the system control portion 14 performs processing of uniformly decreasing the pixel value of each pixel of the input image data g2 by the offset amount (step S7). Step S7 corresponds to the second processing. In addition, step S4 and step S7 constitute a correction step.

A lower part of FIG. 10 illustrates the input image data g2 after processing in step S7 is performed. As illustrated in FIG. 10, by processing in step S7, each pixel value of the input image data g2 is changed to a value less than or equal to the upper limit value.

After step S7, the system control portion 14 projects an image based on the input image data g2 to the screen SC from the projection optical system by inputting the input image data g2 into the light modulation unit 12 (step S8).

In a case where a NO determination is made in step S5, that is, in a case where the pixel value of the maximum pixel is less than or equal to the upper limit value, the system control portion 14 does not perform step S6 and step S7, in other words, decides the offset amount to be zero, and performs processing in step S8.

In a case where new input image data g1 is input after processing in step S8 and step S11 (step S9: YES), the system control portion 14 restores processing to step S1. In a case where the new input image data g1 is not input after processing in step S8 and step S11 (step S9: NO), the system control portion 14 determines whether or not the shift position of the first member 2 is changed (step S10). In a case where the shift position is changed (step S10: YES), the system control portion 14 restores processing to step S2. In a case where the shift position is not changed (step S10: NO), the system control portion 14 restores processing to step S9.

According to the operation illustrated in FIG. 9, as illustrated in FIG. 10, even in a case where the input image data g1 is a white image (all pixel values are 1.0), processing in step S4 and step S7 can set the pixel values of the pixels corresponding to the specific region Ga to be greater than the pixel values of the pixels corresponding to other than the specific region Ga. Consequently, the image G1 based on the input image data g2 has slightly low brightness in the part other than the specific region Ga compared to the state in FIG. 4. However, a brightness difference between the part and the specific region Ga can be eliminated. Accordingly, the image G1 in which the brightness unevenness is reduced can be projected.

In addition, in a case where the input image data g1 is not a white image, and step S6 and step S7 are not performed, a state where only the pixel values of the pixels corresponding to the specific region Ga in the input image data g1 are increased in accordance with the edge part light quantity ratio is set. Consequently, brightness of the specific region Ga in the image G1 can be increased, and the brightness unevenness of the image G1 can be reduced.

First Modification Example of Projector of Embodiment

In the operation example in FIG. 9, in step S6, a difference between the value of the maximum pixel after processing in step S4 and the value before processing in step S4 is decided as the offset amount. As a modification example, the system control portion 14 may decide the offset amount based on a distribution of the pixel values of the pixels corresponding to the specific region Ga in the input image data g2 obtained by processing in step S4.

Figure 11:
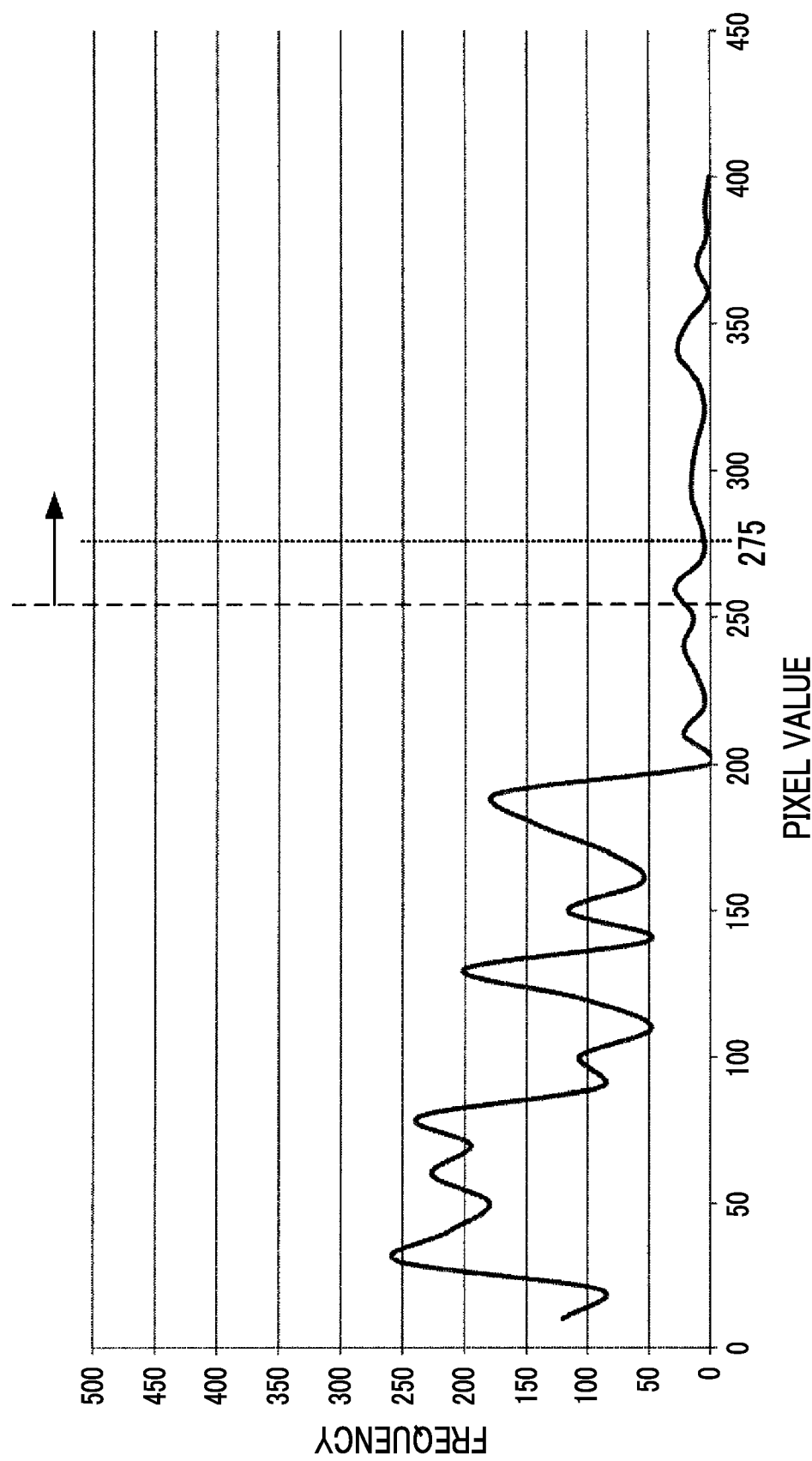
FIG. 11 is a diagram illustrating an example of a histogram of pixel values of input image data g2 obtained by processing in step S4.

FIG. 11 is a diagram illustrating an example of a histogram of pixel values of the input image data g2 obtained by processing in step S4. In FIG. 11, a horizontal axis denotes a pixel value, and a vertical axis denotes a frequency of occurrence of the pixel value. In the histogram illustrated in FIG. 11, a range of greater than or equal to a pixel value of 255 (range on a right side of a broken line in the drawing) is a range exceeding the upper limit value inputtable into the light modulation unit 12. Thus, the range is a part (saturated part) that is not projected as the image.

As a cumulative value of the frequency within the range is increased, a decrease in brightness of the specific region Ga (brightness unevenness of the image G1) is increased. Therefore, the system control portion 14 decides a pixel value within the range in order not to exceed the upper limit value. For example, the system control portion 14 integrates the frequency in order from the highest pixel value within the range and detects a pixel value at a point in time when the integrated value reaches a threshold value (for example, 100). The system control portion 14 decides a difference between the detected pixel value and the upper limit value (255) as the offset amount. For example, in the example in FIG. 11, the integrated value of the frequency within a range of a pixel value of greater than or equal to 275 is 100, and "20" which is the difference between the pixel value: 275 and the pixel value: 255 is decided as the offset amount.

Figure 12:
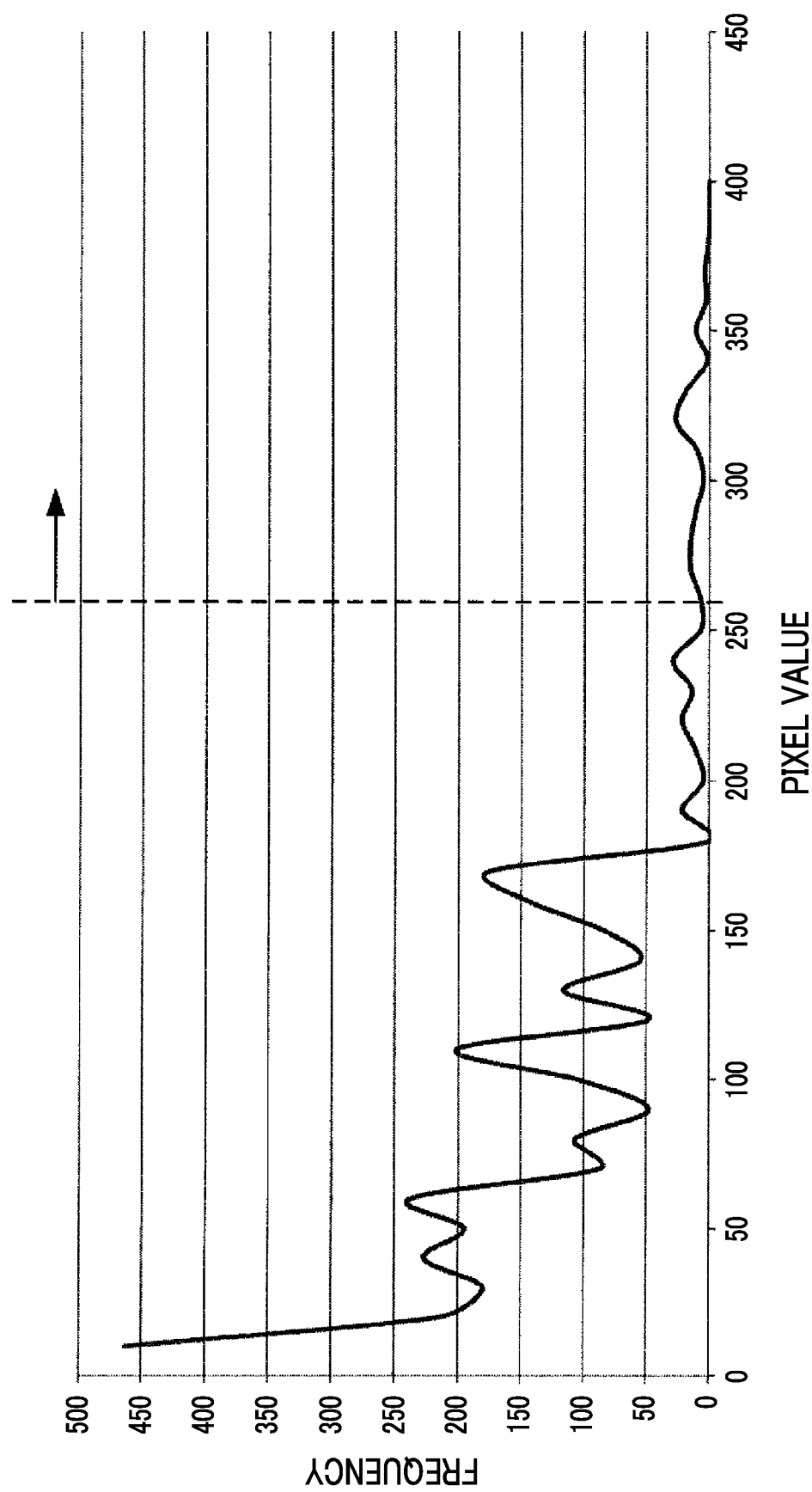
FIG. 12 is a diagram illustrating a histogram in a state where each pixel value of the input image data g2 having the histogram illustrated in FIG. 11 is decreased by "20".

FIG. 12 is a diagram illustrating a histogram in a state where each pixel value of the input image data g2 having the histogram illustrated in FIG. 11 is decreased by "20". As is perceived by comparing FIG. 11 with FIG. 12, by deciding the offset amount based on the histogram, the brightness unevenness of the projected image G1 can be reduced by decreasing the number of pixel values of the saturated part in the specific region Ga in the input image data g2 after the second processing.

Second Modification Example of Projector of Embodiment

In a case of deciding the offset amount in step S6 in FIG. 9, the system control portion 14 may adjust the offset amount based on the input image data g1. Specifically, an adjustment table T2 or an adjustment table T3 illustrated in FIG. 13 is stored in the ROM of the system control portion 14.

The adjustment table T2 is a table in which an adjustment coefficient is associated with each brightness condition of the input image data g1 before processing in step S4. For example, the brightness conditions include a brightness condition L1 that brightness (for example, average brightness) of the input image data g1 exceeds a brightness threshold value, and a brightness condition L2 that the brightness of the input image data g1 is less than or equal to the brightness threshold value. An adjustment coefficient β1 corresponding to the brightness condition L1 is a value greater than an adjustment coefficient β2 corresponding to the brightness condition L2. For example, the adjustment coefficient β1 is "1", and the adjustment coefficient β2 is "0.8".

The adjustment table T3 is a table in which the adjustment coefficient is associated with each attribute condition of the input image data g1 before processing in step S4. Attribute information of image data is information indicating a content of the image data such as whether the image data is based on, for example, a photo or the image data is based on a text (sentence). For example, the attribute information of the image data is added to metadata of the image data in a case of generating the image data.

For example, the attribute conditions include an attribute condition AT1 indicating that the attribute information of the input image data g1 is photo-based, and an attribute condition AT2 indicating that the attribute information of the input image data g1 is text-based. An adjustment coefficient β3 corresponding to the attribute condition AT1 is a value less than an adjustment coefficient β4 corresponding to the attribute condition AT2. For example, the adjustment coefficient β3 is "0.8", and the adjustment coefficient β4 is "1".

After temporarily deciding the offset amount in step S6 using the above method, the system control portion 14 calculates the brightness of the input image data g1. In a case where the calculated brightness exceeds the brightness threshold value, the system control portion 14 decides the offset amount by multiplying the temporarily decided offset amount by the adjustment coefficient β1 of the adjustment table T2. In a case where the calculated brightness is less than or equal to the brightness threshold value, the system control portion 14 decides the offset amount by multiplying the temporarily decided offset amount by the adjustment coefficient β2 of the adjustment table T2.

By the above processing, the offset amount is adjusted to a smaller value in a case where the input image data g1 is dark (in a case where the brightness is less than or equal to the brightness threshold value), than in a case where the input image data g1 is bright (in a case where the brightness exceeds the brightness threshold value). Thus, in a dark image, the brightness unevenness can be reduced while reduction of the entire brightness is prevented. In addition, in a bright image, the brightness unevenness can be powerfully suppressed.

Alternatively, after temporarily deciding the offset amount in step S6 using the above method, the system control portion 14 determines a content of the input image data g1 based on the attribute information of the input image data g1. In a case where the content is photo-based, the system control portion 14 decides the offset amount by multiplying the temporarily decided offset amount by the adjustment coefficient β3 of the adjustment table T3. In a case where the content is text-based, the system control portion 14 decides the offset amount by multiplying the temporarily decided offset amount by the adjustment coefficient β4 of the adjustment table T3.

By the above processing, the offset amount is adjusted to a smaller value in a case where the input image data g1 is photo-based, than in a case where the input image data g1 is text-based. Thus, in the photo-based image for which a wide dynamic range is required, a decrease in dynamic range is prevented while the brightness unevenness is reduced. Accordingly, a high-quality image can be projected. In addition, in the text-based image for which a wide dynamic range is not required, the brightness unevenness can be powerfully suppressed.

Third Modification Example of Projector of Embodiment

In the description thus far, in a case of deciding the offset amount in step S6 in FIG. 9, the system control portion 14 decides the offset amount based on the brightness or the content of the input image data g1 or the pixel values of the input image data g2. Instead, the system control portion 14 may set the offset amount used in processing in step S7 as a predetermined fixed value. Even in a case of setting the offset amount as a fixed value, it is preferable that the offset amount is adjusted by multiplying the fixed value by the adjustment coefficient based on the brightness or the content of the input image data g1.

Fourth Modification Example of Projector of Embodiment

In the second modification example, the system control portion 14 controls the offset amount based on the brightness or the content of the input image data g1. Instead of adjusting the offset amount based on the brightness or the content of the input image data g1 in step S6, the system control portion 14 may control a rate of increase in pixel value of each correction target pixel based on the brightness or the content of the input image data g1 in step S4.

The rate of increase in pixel value of any correction target pixel used in step S4 is the reciprocal of the edge part light quantity ratio at the image height of the specific region Ga corresponding to the correction target pixel. The system control portion 14 may control the rate of increase in accordance with the brightness or the content of the input image data g1 by multiplying the rate of increase by the adjustment coefficient illustrated in FIG. 13 based on the brightness or the content of the input image data g1.

For example, in a case where the brightness of the input image data g1 exceeds the brightness threshold value, the system control portion 14 generates the input image data g2 by multiplying the pixel value of each correction target pixel by a value that is obtained by multiplying the correction coefficient of each correction target pixel used in step S4 by the adjustment coefficient $\beta 1$. In addition, in a case where the brightness of the input image data g1 is less than or equal to the brightness threshold value, the system control portion 14 generates the input image data g2 by multiplying the pixel value of each correction target pixel by a value that is obtained by multiplying the correction coefficient of each correction target pixel used in step S4 by the adjustment coefficient $\beta 2$.

Similarly, in a case where the input image data g1 is photo-based, the system control portion 14 generates the input image data g2 by multiplying the pixel value of each correction target pixel by a value that is obtained by multiplying the correction coefficient of each correction target pixel used in step S4 by the adjustment coefficient $\beta 3$. In addition, in a case where the input image data g1 is text-based, the system control portion 14 generates the input image data g2 by multiplying the pixel value of each correction target pixel by a value that is obtained by multiplying the correction coefficient of each correction target pixel used in step S4 by the adjustment coefficient $\beta 4$.

In this case, the correction coefficient (rate of increase) used in processing in step S4 may be adjusted to be low. In a case where the rate of increase is adjusted to be low, an amount of increase in pixel value of the maximum pixel is also decreased. Thus, the offset amount decided in step S6 is decreased. Consequently, the brightness of the image based on the input image data g2 after processing in step S7 can be optimized in accordance with the brightness or the content of the image.

Fifth Modification Example of Projector of Embodiment

In a case where the offset amount is decided in step S6 in FIG. 9, the system control portion 14 may store the offset amount in the RAM. In a case of deciding the offset amount for the next time, the system control portion 14 may decide the offset amount by considering the offset amount stored in the RAM.

For example, in a case where an amount of change between a past offset amount stored in the RAM and the offset amount decided in step S6 (for example, a difference between both) is greater than or equal to a threshold value, the system control portion 14 decides the past offset amount stored in the RAM as the offset amount to be used in processing in step S7.

A case where the amount of change in offset amount is greater than or equal to the threshold value is a case where the input image data g1 significantly changes as in a motion picture. In a case where the change in offset amount is significant, performing processing in step S7 without changing the offset amount suppresses a change in brightness of the projected image. Accordingly, quality of the projected image can be increased.

In a form of controlling the correction coefficient used in step S4 as described above, in a case where an amount of change between a past correction coefficient stored in the RAM and the correction coefficient decided in step S4 (for example, a difference between both) is greater than or equal to a threshold value, the system control portion 14 may decide the past correction coefficient stored in the RAM as the correction coefficient to be used in processing in step S4.

A case where the amount of change in correction coefficient is greater than or equal to the threshold value is a case where the input image data g1 significantly changes as in a motion picture. In a case where the change in correction coefficient is significant, performing processing in step S4 without changing the correction coefficient suppresses a change in brightness of the projected image. Accordingly, the quality of the projected image can be increased.

In addition, the system control portion 14 may obtain an amount of change between past input image data g1 stored in the RAM and the currently acquired input image data g1. In a case where the amount of change is a value with which a determination that the input image data g1 is a motion picture can be made, the system control portion 14 may decide the past offset amount or correction coefficient stored in the RAM as the offset amount or the correction coefficient to be used in processing in step S7 or step S4. Even by doing so, the quality of the projected image can be increased by suppressing a change in brightness of the projected image.

Sixth Modification Example of Projector of Embodiment

In a case where the shift position illustrated in FIG. 4 is changed to the shift position illustrated in FIG. 5, or in a case where the shift position illustrated in FIG. 6 is changed to the shift position illustrated in FIG. 5, it is preferable that the system control portion 14 performs processing in step S7 on the input image data g1 using the offset amount decided in step S6 before the change in shift position and project the image based on the input image data g1 after processing to the screen SC.

In the operation example in FIG. 9, for example, in a case where the shift position is changed from the shift position PU or the shift position PD to the shift position PC, processing in step S11 is performed. That is, the image based on the input image data g1 is projected by inputting the input image data g1 into the light modulation unit 12 without correcting the input image data g1.

In this modification example, in a case where a YES determination is made in step S2, and the offset amount immediately previously decided in step S6 is stored in the RAM, the system control portion 14 performs processing of uniformly decreasing each pixel value of the input image data g1 by the offset amount using the offset amount. Then, processing transitions to step S11.

According to this modification example, even in a case where the shift position is the shift position PU or the shift position PD, and the shift position is changed from the state where processing in step S7 is performed to the shift position PC at which processing in step S7 is not necessary, the brightness of the entire input image data g1 can be approximated to brightness of the input image data g2 before the change in shift position. Consequently, a significant change in brightness of the projection image due to a change in shift position can be suppressed.

Seventh Modification Example of Projector of Embodiment

In this modification example, a system that displays one large screen using a plurality of the projectors 100 illustrated in FIG. 1 is assumed. The large screen is formed in a state where the image projected to the screen SC from each projector 100 partially overlaps.

In a case where the system control portion 14 of a specific projector 100 is connected to the system control portion 14 of another projector 100 other than the specific projector 100, the system control portion 14 of the specific projector 100 operates in a panoramic mode.

In the panoramic mode, the system control portion 14 acquires each of the input image data g1 for the specific projector 100 that is a base of the image to be projected from the specific projector 100, and the input image data g1 for the other projector 100 that is a base of the image to be projected from the other projector 100. In a case where the input image data g1 for the specific projector 100 is acquired, the system control portion 14 corrects the input image data g1 in accordance with the operation illustrated in FIG. 9. Using the correction coefficient of the correction target pixel and the offset amount used in this correction, the system control portion 14 corrects the input image data g1 for the other projector 100 in the same manner and transmits the input image data g2 after correction to the system control portion 14 of the other projector 100. Accordingly, the image based on the input image data g2 corrected with the same parameters (the correction coefficient and the offset amount) is projected to the screen SC from each projector 100.

According to this modification example, in a case of performing large screen projection from the plurality of projectors 100 by causing the images to partially overlap, a difference in brightness of each image can be suppressed. Accordingly, quality of the images in a case of large screen projection can be increased.

Eighth Modification Example of Projector of Embodiment

The projector 100 illustrated in FIG. 1 is described as being used in an installation state where the direction Y2 illustrated in FIG. 3 is the vertical direction. However, for example, the projector 100 may be used in an installation state where the direction Y1 is the vertical direction by installing the projector 100 on a ceiling.

In the installation state where the direction Y1 is the vertical direction, the image displayed on the display surface of the display portion needs to be inverted upside down with respect to the installation state in FIG. 3. Meanwhile, positions of the correction target pixels corresponding to the specific region Ga illustrated in FIG. 4 or FIG. 6 are decided by the shift position or the projection condition and do not change depending on the installation state of the projector 100.

Therefore, the system control portion 14 first determines whether the installation state is a first installation state where the direction Y2 is the vertical direction, or a second installation state where the direction Y1 is the vertical direction, based on information of an acceleration sensor or the like disposed in the projector 100. In a case of the first installation state, the system control portion 14 corrects the input image data g1 in accordance with the above content. In a case of the second installation state, the system control portion 14 inverts the acquired input image data g1 upside down and then, corrects the input image data g1 in accordance with the above content.

Accordingly, in a case of the second installation state, instead of correcting the input image data g1 in accordance with the above content and then, projecting the image by inverting the input image data g1 after correction upside down, by inverting the input image data g1 upside down and then, correcting the input image data g1 and projecting the image based on the input image data g1 after correction, the brightness unevenness of the projected image can be reduced even in a case where the installation state changes.

Ninth Modification Example of Projector of Embodiment

The system control portion 14 may be able to selectively execute a correction mode in which the processing (processing including correction (the first processing and the second processing) of the input image data g1) illustrated in FIG. 9 is performed, and a non-correction mode in which the processing (correction (the first processing and the second processing) of the input image data g1) illustrated in FIG. 9 is not performed. In the non-correction mode, after step S1 illustrated in FIG. 9, processing in step S11 is performed, and processing transitions to step S9.

For example, in a case where a switching instruction input from an operating part, not illustrated, disposed in the projector 100 is received, the system control portion 14 switches between the correction mode and the non-correction mode. The system control portion 14 may determine the content of the input image data g1 and execute the correction mode in a case where the input image data g1 is a still picture, and execute the non-correction mode in a case where the input image data g1 is a motion picture.

Tenth Modification Example of Projector of Embodiment

In the description thus far, the correction tables T1 illustrated in FIG. 8 are stored in advance in the ROM of the system control portion 14. However, in a case where the optical unit 6 is interchangeable, and the optical characteristic of the optical unit 6 is not known, the correction tables T1 cannot be used for correction.

Therefore, in a case where the optical unit 6 with which the correction table T1 is not stored in association is mounted, the system control portion 14 projects a test image based on test image data (for example, data for displaying a white image) to the screen SC by inputting the test image data into the light modulation unit 12.

In a state where the test image is projected, the system control portion 14 captures the test image using the imaging element 38 and acquires captured image data obtained by imaging. The system control portion 14 analyzes a pixel value of each pixel of the captured image data and detects the specific region decided by a light quantity distribution in a surface of the screen SC in the test image projected to the screen SC. Pixels corresponding to the specific region in the captured image data are set as the correction target pixels. A reciprocal of a ratio of the pixel values of the correction target pixels and the pixel values of the pixels outside the specific region in the captured image data is calculated as the correction coefficient and is registered in a correction table. By generating the correction table based on the captured image data, the system control portion 14 can reduce the brightness unevenness of the projected image even in a case where the optical unit 6 having an unknown optical characteristic is mounted.

The embodiment and the modification examples described thus far can be appropriately combined without contradiction.

In the projector 100 illustrated in FIG. 1, the imaging portion is configured to image the screen SC through a part of the projection optical system. Instead, the imaging portion may be disposed separately from the optical unit 6. In addition, the configuration of the optical unit 6 of the projector 100 is an example and is not limited to the illustration in FIG. 3. For example, the image from the display portion may be configured to be directly incident on the second optical system 31. In addition, the shift mechanism 5 is not essential and can be omitted.

(1) A control device of a projection apparatus that projects an image from a display portion displaying the image based on input image data to a projection object through an optical system, the control device comprising a correction portion that corrects the input image data by performing first processing of increasing pixel values of pixels of the input image data corresponding to a specific region decided by a light quantity distribution in a surface of the projection object in the image projected to the projection object, and second processing of uniformly decreasing each pixel value of the input image data by a first pixel amount.

(2) The control device according to (1), in which the light quantity distribution is decided based on an optical characteristic of the optical system.

(3) The control device according to (2), in which the optical characteristic is a ratio of a light quantity projected to an optical axis position of the optical system and a light quantity projected to a position separated from the optical axis position.

(4) The control device according to any one of (1) to (3), in which the correction portion controls the first pixel amount based on the pixel values of the pixels corresponding to the specific region after the first processing.

(5) The control device according to (4), in which the correction portion controls the first pixel amount based on the pixel value of a maximum pixel having a maximum pixel value among the pixels corresponding to the specific region after the first processing.

(6) The control device according to (5), in which in a case where the pixel value of the maximum pixel exceeds an upper limit value inputtable into the display portion, the correction portion sets a difference between the pixel value of the maximum pixel and the pixel value of the maximum pixel before the first processing as the first pixel amount.

(7) The control device according to (5), in which in a case where the pixel value of the maximum pixel is less than or equal to an upper limit value inputtable into the display portion, the correction portion does not perform the second processing.

(8) The control device according to (4), in which the correction portion controls the first pixel amount based on a distribution of the pixel values of the pixels corresponding to the specific region after the first processing.

(9) The control device according to any one of (1) to (3), in which the correction portion controls a rate of increase in the pixel value in the first processing or the first pixel amount based on the input image data before correction.

(10) The control device according to (9), in which the correction portion controls the rate of increase or the first pixel amount based on brightness of the input image data before correction.

(11) The control device according to (9), in which the correction portion controls the rate of increase or the first pixel amount based on a content of the input image data before correction.

(12) The control device according to any one of (9) to (11), in which in correcting a plurality of pieces of the input image data, in a case where an amount of change between the input image data or an amount of change in the rate of increase or the first pixel amount is greater than or equal to a threshold value, the correction portion maintains the rate of increase or the first pixel amount as a value used for correction of the immediately previously corrected input image data.

(13) The control device according to any one of (1) to (12), in which the correction portion controls a position of the pixel of which the pixel value is increased in the first processing, and a rate of increase in the pixel value based on a projection condition of the image.

(14) The control device according to (13), in which the projection condition includes at least one of a focal length of the optical system, a focal position of the optical system, or a distance between the optical system and the projection object.

(15) The control device according to any one of (1) to (14), in which the projection apparatus has a mode in which a plurality of the images are projected to the projection object in a partially overlapping state in cooperation with another projection apparatus, and in the mode, the correction portion executes the second processing on the input image data input into the display portion of the other projection apparatus using the first pixel amount decided in the projection apparatus.

(16) The control device according to any one of (1) to (14), in which the projection apparatus is capable of projecting the image in a state where a display surface of the display portion is biased to one direction with respect to an optical axis of the optical system, and the correction portion rotates the input image data based on an attitude of the projection apparatus and then, performs the first processing and the second processing.

(17) The control device according to any one of (1) to (14), in which the projection apparatus includes a shift mechanism that changes a relative position in one direction between a display surface of the display portion and an optical axis of the optical system, and the correction portion performs correction including the first processing and the second processing at the relative position at which the specific region occurs.

(18) The control device according to (17), in which in a case where the relative position at which the specific region occurs is changed to the relative position at which the specific region disappears, the correction portion performs, instead of the correction, processing of uniformly decreasing each pixel value of the input image data by the first pixel amount in the correction before the change.

(19) The control device according to any one of (1) to (18), in which the projection apparatus includes an imaging portion that images the projection object, and the correction portion detects the specific region based on captured image data, acquired from the imaging portion, of the image projected to the projection object.

(20) The control device according to any one of (1) to (19), in which the specific region is an edge part region of the image projected to the projection object.

(21) The control device according to any one of (1) to (20), in which a correction mode in which correction including the first processing and the second processing is executed, and a non-correction mode in which the correction is not executed are selectively executed.

(22) The control device according to (21), in which the correction mode and the non-correction mode are switched based on an input instruction.

(23) The control device according to (21), in which the correction mode and the non-correction mode are switched based on a content of the input image data.

(24) A projection apparatus comprising the control device according to any one of (1) to (23), and the optical system.

(25) A control method of a projection apparatus that projects an image from a display portion displaying the image based on input image data to a projection object through an optical system, the control method comprising a correction step of correcting the input image data by performing first processing of increasing pixel values of pixels of the input image data corresponding to a specific region decided by a light quantity distribution in a surface of the projection object in the image projected to the projection object, and second processing of uniformly decreasing each pixel value of the input image data by a first pixel amount.

(26) The control method according to (25), in which the light quantity distribution is decided based on an optical characteristic of the optical system.

(27) The control method according to (26), in which the optical characteristic is a ratio of a light quantity projected to an optical axis position of the optical system and a light quantity projected to a position separated from the optical axis position.

(28) The control method according to any one of (25) to (27), in which in the correction step, the first pixel amount is controlled based on the pixel values of the pixels corresponding to the specific region after the first processing.

(29) The control method according to (28), in which in the correction step, the first pixel amount is controlled based on the pixel value of a maximum pixel having a maximum pixel value among the pixels corresponding to the specific region after the first processing.

(30) The control method according to (29), in which in the correction step, in a case where the pixel value of the maximum pixel exceeds an upper limit value inputtable into the display portion, a difference between the pixel value of the maximum pixel and the pixel value of the maximum pixel before the first processing is set as the first pixel amount.

(31) The control method according to (29), in which in the correction step, in a case where the pixel value of the maximum pixel is less than or equal to an upper limit value inputtable into the display portion, the second processing is not performed.

(32) The control method according to (28), in which in the correction step, the first pixel amount is controlled based on a distribution of the pixel values of the pixels corresponding to the specific region after the first processing.

(33) The control method according to any one of (25) to (27), in which in the correction step, a rate of increase in the pixel value in the first processing or the first pixel amount is controlled based on the input image data before correction.

(34) The control method according to (33), in which in the correction step, the rate of increase or the first pixel amount is controlled based on brightness of the input image data before correction.

(35) The control method according to (33), in which in the correction step, the rate of increase or the first pixel amount is controlled based on a content of the input image data before correction.

(36) The control method according to any one of (33) to (35), in which in the correction step, in correcting a plurality of pieces of the input image data, in a case where an amount of change between the input image data or an amount of change in the rate of increase or the first pixel amount is greater than or equal to a threshold value, the rate of increase or the first pixel amount is maintained as a value used for correction of the immediately previously corrected input image data.

(37) The control method according to any one of (25) to (36), in which in the correction step, a position of the pixel of which the pixel value is increased in the first processing, and a rate of increase in the pixel value are controlled based on a projection condition of the image.

(38) The control method according to (37), in which the projection condition includes at least one of a focal length of the optical system, a focal position of the optical system, or a distance between the optical system and the projection object.

(39) The control method according to any one of (25) to (38), in which the projection apparatus has a mode in which a plurality of the images are projected to the projection object in a partially overlapping state in cooperation with another projection apparatus, and in the correction step, in the mode, the second processing on the input image data input into the display portion of the other projection apparatus is executed using the first pixel amount decided in the projection apparatus.

(40) The control method according to any one of (25) to (38), in which the projection apparatus is capable of projecting the image in a state where a display surface of the display portion is biased to one direction with respect to an optical axis of the optical system, and in the correction step, the input image data is rotated based on an attitude of the projection apparatus, and then, the first processing and the second processing are performed.

(41) The control method according to any one of (25) to (38), in which the projection apparatus includes a shift mechanism that changes a relative position in one direction between a display surface of the display portion and an optical axis of the optical system, and in the correction step, correction including the first processing and the second processing is performed at the relative position at which the specific region occurs.

(42) The control method according to (41), in which in the correction step, in a case where the relative position at which the specific region occurs is changed to the relative position at which the specific region disappears, processing of uniformly decreasing each pixel value of the input image data by the first pixel amount in the correction before the change is performed instead of the correction.

(43) The control method according to any one of (25) to (42), in which the projection apparatus includes an imaging portion that images the projection object, and in the correction step, the specific region is detected based on captured image data, acquired from the imaging portion, of the image projected to the projection object.

(44) The control method according to any one of (25) to (43), in which the specific region is an edge part region of the image projected to the projection object.

(45) The control method according to any one of (25) to (44), in which a correction mode in which correction including the first processing and the second processing is executed, and a non-correction mode in which the correction is not executed are selectively executed.

(46) The control method according to (45), in which the correction mode and the non-correction mode are switched based on an input instruction.

(47) The control method according to (45), in which the correction mode and the non-correction mode are switched based on a content of the input image data.

(48) A control program of a projection apparatus that projects an image from a display portion displaying the image based on input image data to a projection object through an optical system, the control program causing a computer to execute a correction step of correcting the input image data by performing first processing of increasing pixel values of pixels of the input image data corresponding to a specific region decided by a light quantity distribution in a surface of the projection object in the image projected to the projection object, and second processing of uniformly decreasing each pixel value of the input image data by a first pixel amount.

While various embodiments are described above with reference to the drawings, the present invention is not limited to such examples. It is apparent that those skilled in the art may perceive various modification examples or correction examples within a scope disclosed in the claims, and those examples are also understood as falling in a technical scope of the present invention. In addition, any combination of various constituents in the embodiment may be used without departing from a gist of the invention.

The present application is based on Japanese Patent Application (JP2019-138119) filed on Jul. 26, 2019, the content of which is incorporated in the present application by reference.

EXPLANATION OF REFERENCES

100: projector
1: body part
2: first member
2a, 2b: opening
2A: hollow portion
21: first optical system
22: reflective member
3: second member
3a, 3c: opening
3A: hollow portion
31: second optical system
32: branch member
33: third optical system
34: lens
37: fourth optical system
38: imaging element
39: image processing portion
5: shift mechanism
6: optical unit
11: light source unit
41: light source
42: color wheel
43: illumination optical system
12: light modulation unit
12a: light modulation element
12b: light modulation element driving portion
14: system control portion
15: housing
15a: opening
K: optical axis
SC: screen
C1: image circle
C2: boundary circle
G1: image
Ga: specific region
g1, g2: input image data
M1: difference
T1: correction table
T2, T3: adjustment table

What is claimed is:

1. A control device of a projection apparatus that projects an image from a display portion displaying the image based on input image data to a projection object through an optical system, the control device comprising:
    at least one processor that corrects the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount,
    wherein the at least one processor controls the first pixel amount based on the pixel value of a maximum pixel having a maximum pixel value among the pixels corresponding to the specific region after the first processing.

2. The control device according to claim 1,
    wherein the light quantity distribution is determined based on an optical characteristic of the optical system.

3. The control device according to claim 2,
    wherein the optical characteristic is a ratio of a light quantity projected to an optical axis position of the optical system and a light quantity projected to a position separated from the optical axis position.

4. The control device according to claim 1,
    wherein in a case where the pixel value of the maximum pixel exceeds an upper limit value inputtable into the display portion, the at least one processor sets a difference between the pixel value of the maximum pixel and the pixel value of the maximum pixel before the first processing as the first pixel amount.

5. The control device according to claim 1,
    wherein in a case where the pixel value of the maximum pixel is less than or equal to an upper limit value inputtable into the display portion, the at least one processor does not perform the second processing.

6. A control device of a projection apparatus that projects an image from a display portion displaying the image based on input image data to a projection object through an optical system, the control device comprising:
    at least one processor that corrects the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount,
    wherein the at least one processor controls a rate of increase in the pixel value in the first processing or the first pixel amount based on the input image data before the correction by the at least one processor, and in correcting a plurality of pieces of the input image data, in a case where an amount of change between the input image data or an amount of change in the rate of increase or the first pixel amount is greater than or equal to a threshold value, the at least one processor maintains the rate of increase or the first pixel amount as a value used for correction of the immediately previously corrected input image data.

7. The control device according to claim 1,
wherein the at least one processor controls a position of the pixel of which the pixel value is increased in the first processing, and a rate of increase in the pixel value based on a projection condition of the image.

8. The control device according to claim 7,
wherein the projection condition includes at least one of a focal length of the optical system, a focal position of the optical system, or a distance between the optical system and the projection object.

9. A control device of a projection apparatus that projects an image from a display portion displaying the image based on input image data to a projection object through an optical system, the control device comprising:
at least one processor that corrects the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount,
wherein the projection apparatus has a mode in which a plurality of the images are projected to the projection object in a partially overlapping state in cooperation with another projection apparatus, and
in the mode, the at least one processor executes the second processing on the input image data input into the display portion of the another projection apparatus using the first pixel amount determined in the projection apparatus.

10. The control device according to claim 1,
wherein the projection apparatus is capable of projecting the image in a state where a display surface of the display portion is biased to one direction with respect to an optical axis of the optical system, and
the at least one processor rotates the input image data based on an attitude of the projection apparatus and then, performs the first processing and the second processing.

11. The control device according to claim 1,
wherein the projection apparatus includes a shift mechanism that changes a relative position in one direction between a display surface of the display portion and an optical axis of the optical system, and
the at least one processor performs correction including the first processing and the second processing at the relative position at which the specific region occurs.

12. A control device of a projection apparatus that projects an image from a display portion displaying the image based on input image data to a projection object through an optical system, the control device comprising:
at least one processor that corrects the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount,
wherein the projection apparatus includes a shift mechanism that changes a relative position in one direction between a display surface of the display portion and an optical axis of the optical system,
the at least one processor performs correction including the first processing and the second processing at the relative position at which the specific region occurs, and
in a case where the relative position at which the specific region occurs is changed to the relative position at which the specific region disappears, the at least one processor performs, instead of the correction, processing of uniformly decreasing each of pixel values of pixels of the input image data by the first pixel amount in the correction before the change.

13. The control device according to claim 1,
wherein the projection apparatus includes an imaging portion that images the projection object, and
the at least one processor detects the specific region based on captured image data, acquired from the imaging portion, of the image projected to the projection object.

14. The control device according to claim 1,
wherein the specific region is an edge part region of the image projected to the projection object.

15. The control device according to claim 1,
wherein a correction mode in which correction including the first processing and the second processing is executed, and a non-correction mode in which the correction is not executed are selectively executed.

16. The control device according to claim 15,
wherein the correction mode and the non-correction mode are switched based on an input instruction.

17. The control device according to claim 15,
wherein the correction mode and the non-correction mode are switched based on a content of the input image data.

18. A projection apparatus comprising:
the control device according to claim 1; and
the optical system.

19. A control method of a projection apparatus that projects an image from a display portion displaying the image based on input image data to a projection object through an optical system, the control method comprising:
a correction step, implemented by at least one processor, of correcting the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount,
wherein in the correction step, the first pixel amount is controlled based on the pixel value of a maximum pixel having a maximum pixel value among the pixels corresponding to the specific region after the first processing.

20. A control method of a projection apparatus that projects an image from a display portion displaying the image based on input image data to a projection object through an optical system, the control method comprising:
a correction step, implemented by at least one processor, of correcting the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount,
wherein in the correction step, a rate of increase in the pixel value in the first processing or the first pixel amount is controlled based on the input image data before the correction by the correction step, and
in the correction step, in correcting a plurality of pieces of the input image data, in a case where an amount of change between the input image data or an amount of change in the rate of increase or the first pixel amount is greater than or equal to a threshold value, the rate of increase or the first pixel amount is maintained as a value used for correction of the immediately previously corrected input image data.

21. A control method of a projection apparatus that projects an image from a display portion displaying the image based on input image data to a projection object through an optical system, the control method comprising:
 a correction step, implemented by at least one processor, of correcting the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount,
 wherein the projection apparatus has a mode in which a plurality of the images are projected to the projection object in a partially overlapping state in cooperation with another projection apparatus, and
 in the correction step, in the mode, the second processing on the input image data input into the display portion of the another projection apparatus is executed using the first pixel amount determined in the projection apparatus.

22. A control method of a projection apparatus that projects an image from a display portion displaying the image based on input image data to a projection object through an optical system, the control method comprising:
 a correction step, implemented by at least one processor, of correcting the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount,
 wherein the projection apparatus includes a shift mechanism that changes a relative position in one direction between a display surface of the display portion and an optical axis of the optical system,
 in the correction step, correction including the first processing and the second processing is performed at the relative position at which the specific region occurs, and
 in the correction step, in a case where the relative position at which the specific region occurs is changed to the relative position at which the specific region disappears, processing of uniformly decreasing each of pixel values of pixels of the input image data by the first pixel amount in the correction before the change is performed instead of the correction.

23. A non-transitory computer readable medium storing a control program of a projection apparatus that projects an image from a display portion displaying the image based on input image data to a projection object through an optical system, the control program causing a computer to execute:
 a correction step, implemented by at least one processor, of correcting the input image data by performing first processing of increasing pixel values of pixels of the input image data corresponding to a specific region determined by a light quantity distribution in a surface of the projection object in the image projected to the projection object, and second processing of uniformly decreasing each of pixel values of pixels of the input image data by a first pixel amount
 wherein in the correction step, the first pixel amount is controlled based on the pixel value of a maximum pixel having a maximum pixel value among the pixels corresponding to the specific region after the first processing.

* * * * *